US010671280B2

(12) United States Patent
Rekimoto

(10) Patent No.: US 10,671,280 B2
(45) Date of Patent: *Jun. 2, 2020

(54) USER INPUT APPARATUS, COMPUTER CONNECTED TO USER INPUT APPARATUS, AND CONTROL METHOD FOR COMPUTER CONNECTED TO USER INPUT APPARATUS, AND STORAGE MEDIUM

(71) Applicant: Sony Corporation, Tokyo (JP)

(72) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,419

(22) Filed: Nov. 13, 2018

(65) Prior Publication Data

US 2019/0079671 A1    Mar. 14, 2019

Related U.S. Application Data

(63) Continuation of application No. 14/823,919, filed on Aug. 11, 2015, now Pat. No. 10,140,016, which is a
(Continued)

(30) Foreign Application Priority Data

May 21, 2001  (JP) ................................ 2001-151499
Jun.  1, 2001  (JP) ................................ 2001-167250

(51) Int. Cl.
*G09G 5/00*      (2006.01)
*G06F 3/0488*    (2013.01)
(Continued)

(52) U.S. Cl.
CPC ...... *G06F 3/04886* (2013.01); *G02F 1/13338* (2013.01); *G06F 1/16* (2013.01);
(Continued)

(58) Field of Classification Search
CPC .......... G06F 3/04886; G06F 1/16; G06F 3/02; G06F 3/03; G06F 3/038; G06F 3/0412;
(Continued)

(56) References Cited

U.S. PATENT DOCUMENTS 4,071,691 A    1/1978 Pepper, Jr.
4,550,310 A   10/1985 Yamaguchi et al.
(Continued)

FOREIGN PATENT DOCUMENTS

DE    195 42 407 A1    5/1996
JP    02-16619          1/1990
(Continued)

OTHER PUBLICATIONS

Matlas, Edgar et al., Half-QWERTY: A One-Handed Keyboard Facilitating Skill Transfer From QWERTY, Conference Proceedings on Human Factors in Computer Systems, 1993, pp. 88-94.

*Primary Examiner* — Jennifer T Nguyen
(74) *Attorney, Agent, or Firm* — Michael Best & Friedrich LLP

(57) ABSTRACT

A user input apparatus is provided with user input means for the user to input data or a command by using the user's human body, and use-form detection means for detecting a form in which the user uses the user input means by the user's human body. A computer connected to the user input apparatus changes the operation of the application being executed by application execution means, according to a detection result obtained by the use-form detection means. Therefore, input operations can be performed without inconvenience even if the user cannot use one hand due to another work.

20 Claims, 22 Drawing Sheets

Related U.S. Application Data continuation of application No. 14/533,524, filed on Nov. 5, 2014, now abandoned, which is a continuation of application No. 14/310,228, filed on Jun. 20, 2014, now Pat. No. 9,134,840, which is a continuation of application No. 14/250,570, filed on Apr. 11, 2014, now Pat. No. 9,898,191, which is a continuation of application No. 10/478,541, filed as application No. PCT/JP02/04875 on May 21, 2002, now Pat. No. 8,773,351.

(51) Int. Cl.
| | | |
|---|---|---|
| *G06F 3/041* | (2006.01) | |
| *G06F 1/16* | (2006.01) | |
| *G06F 3/023* | (2006.01) | |
| *G06F 3/038* | (2013.01) | |
| *G06F 21/32* | (2013.01) | |
| *G06F 21/83* | (2013.01) | |
| *G06F 3/044* | (2006.01) | |
| *G02F 1/1333* | (2006.01) | |
| *G06F 3/0481* | (2013.01) | |

(52) U.S. Cl.
CPC .............. *G06F 3/023* (2013.01); *G06F 3/038* (2013.01); *G06F 3/044* (2013.01); *G06F 3/0412* (2013.01); *G06F 3/0416* (2013.01); *G06F 3/0488* (2013.01); *G06F 3/04817* (2013.01); *G06F 21/32* (2013.01); *G06F 21/83* (2013.01); *G06F 2203/04108* (2013.01); *G06F 2203/04111* (2013.01); *G06F 2203/04112* (2013.01)

(58) Field of Classification Search
CPC .... G06F 3/0416; G06F 3/044; G06F 3/04817; G06F 3/0488; G06F 21/32; G06F 21/83; G02F 1/13338
USPC ......................................... 345/174; 178/18.06
See application file for complete search history.

(56) References Cited

U.S. PATENT DOCUMENTS

| | | | |
|---|---|---|---|
| 4,561,002 A | 12/1985 | Chiu | |
| 4,723,056 A | 2/1988 | Tamaru et al. | |
| 4,806,709 A | 2/1989 | Evans | |
| 5,149,918 A | 9/1992 | Kozik et al. | |
| 5,414,413 A | 5/1995 | Tamaru et al. | |
| 5,543,590 A | 8/1996 | Gillespie et al. | |
| 5,557,076 A | 9/1996 | Wieczorek et al. | |
| 5,565,658 A | 10/1996 | Gerpheide et al. | |
| 5,579,037 A | 11/1996 | Tahara et al. | |
| 5,790,106 A | 8/1998 | Hirano et al. | |
| 5,831,600 A | 11/1998 | Inoue et al. | |
| 5,844,506 A | 12/1998 | Binstead | |
| 5,920,309 A | 7/1999 | Bisset et al. | |
| 5,945,980 A | 8/1999 | Moissev et al. | |
| 6,054,979 A | 4/2000 | Sellers | |
| 6,073,036 A | 6/2000 | Heikkinen et al. | |
| 6,137,427 A | 10/2000 | Binstead | |
| 6,219,037 B1 | 4/2001 | Lee | |
| 6,232,957 B1 | 5/2001 | Hinckley | |
| 6,239,788 B1 | 5/2001 | Nohno et al. | |
| 6,310,610 B1 | 10/2001 | Beaton et al. | |
| 6,323,846 B1 * | 11/2001 | Westerman | G06F 3/0235 345/173 |
| 6,333,753 B1 | 12/2001 | Hinckley | |
| 6,340,979 B1 | 1/2002 | Beaton et al. | |
| 6,400,359 B1 | 6/2002 | Katabami | |
| 6,437,314 B1 | 8/2002 | Usuda et al. | |
| 6,452,514 B1 * | 9/2002 | Philipp | G01D 5/2405 178/18.06 |
| 6,492,979 B1 | 12/2002 | Kent et al. | |
| 6,504,530 B1 | 1/2003 | Wilson et al. | |
| 6,664,951 B1 | 12/2003 | Fujii et al. | |
| 6,677,930 B2 | 1/2004 | Nakamura et al. | |
| 6,765,557 B1 | 7/2004 | Segal et al. | |
| 6,943,778 B1 | 9/2005 | Astala et al. | |
| 7,012,595 B2 | 3/2006 | Lu | |
| 7,030,860 B1 * | 4/2006 | Hsu | G06F 3/044 178/18.06 |
| 7,236,159 B1 | 6/2007 | Siversson | |
| 8,773,351 B2 * | 7/2014 | Rekimoto | G06F 3/023 345/156 |
| 9,134,840 B2 * | 9/2015 | Rekimoto | G06F 3/023 |
| 10,140,016 B2 * | 11/2018 | Rekimoto | G06F 3/023 |
| 2002/0044133 A1 | 4/2002 | Nakamura et al. | |
| 2002/0093491 A1 | 7/2002 | Gillespie et al. | |
| 2002/0130848 A1 | 9/2002 | Sims | |
| 2002/0171610 A1 | 11/2002 | Siwinski et al. | |
| 2003/0067451 A1 | 4/2003 | Tagg et al. | |
| 2014/0293165 A1 | 10/2014 | Rekimoto | |
| 2014/0300579 A1 | 10/2014 | Rekimoto | |
| 2015/0054787 A1 | 2/2015 | Rekimoto | |

FOREIGN PATENT DOCUMENTS

| | | |
|---|---|---|
| JP | 05-108267 | 4/1993 |
| JP | 07-253846 | 10/1995 |
| JP | 08-137607 | 5/1996 |
| JP | 2000-089896 A | 3/2000 |
| JP | 2000-148359 A | 5/2000 |
| JP | 2000-330946 A | 11/2000 |

* cited by examiner

USER INPUT APPARATUS, COMPUTER CONNECTED TO USER INPUT APPARATUS, AND CONTROL METHOD FOR COMPUTER CONNECTED TO USER INPUT APPARATUS, AND STORAGE MEDIUM

CROSS REFERENCES TO RELATED APPLICATIONS

The present application is a Continuation of application Ser. No. 14/823,919, filed on Aug. 11, 2015, which is a Continuation of application Ser. No. 14/533,524, filed on Nov. 5, 2014 (abandoned), which is a Continuation of application Ser. No. 14/310,228, filed on Jun. 20, 2014, now U.S. Pat. No. 9,134,840, issued on Sep. 15, 2015, which is a Continuation of application Ser. No. 14/250,570, filed on Apr. 11, 2014, now U.S. Pat. No. 9,898,191, issued on Feb. 20, 2018, which is a Continuation of application Ser. No. 10/478,541, filed on Jul. 6, 2004, now U.S. Pat. No. 8,773,351, issued on Jul. 8, 2014, which is a National Stage Application of PCT/JP 2002/004875, filed on May 21, 2002, which claims priority from Japanese Patent Application JP 2001-151499, filed in the Japanese Patent Office on May 21, 2001 and Japanese Patent Application JP 2001-167250 filed in the Japanese Patent Office on Jun. 1, 2001. The entire contents of these applications are incorporated herein by reference.

TECHNICAL FIELD

The present invention relates to user input apparatuses used by the user to input commands and others to a computer, computers connected to the user input apparatuses and control methods for the computers connected to the user input apparatuses, and storage media, and more particularly, to user input apparatuses where the user performs input operations by using part of the user's body as with a keyboard or a mouse, computers connected to the user input apparatuses and control methods for the computers connected to the user input apparatuses, and storage media.

More specifically, the present invention relates to user input apparatuses designed such that the user operates the apparatuses by both hands, computers connected to the user input apparatuses and control methods for the computers connected to the user input apparatuses, and storage media, and more particularly, to user input apparatuses allowing the user to perform input operations without inconvenience even if the user cannot use one hand due to other work while the apparatuses are designed such that the user operates the apparatuses by both hands, computers connected to the user input apparatuses and control methods for the computers connected to the user input apparatuses, and storage media.

BACKGROUND ART

Due to recent technical innovations, general-purpose computer systems called workstations (WSs) and personal computers (PCs), which are relatively compact, low priced, highly valued added, and highly functioned, have been developed and made commercially available, and have been used in research organizations, such as universities and colleges, and company offices, and further in daily life in ordinary houses. Nowadays, Most of daily work is related to computers, and many persons each spend a day touching a keyboard and a mouse.

Usually, the user uses both hands to operate a keyboard. In some occasions, the user cannot use either of them.

When the user is operating a mouse, for example, the right hand (or the dominant hand) is on the mouse. When the user uses a telephone while operating a computer, the user cannot use a hand that is holding the handset to operate the keyboard.

Conventional keyboards are not designed for unfortunate cases in which the user cannot use either of the hands for operation. Therefore, one-hand difficult operations may be required, which largely reduces operability of computers.

When a key usually operated by the left hand is required to be operated by the right hand, or when it is required that a key disposed at a right-hand side be pressed while a control key or a shift key disposed at a left-hand side is being pressed, if one hand cannot be used due to other work, the input operation becomes difficult to perform or impossible.

Computer systems are generally driven in response to user input commands, and display processing results on display screens to provide an interactive processing environment. As a recent trend, conventional character-based user input environments using keyboards, that is, "CUIs (character user interfaces)", typical of which is a DOS (disk operating system) shell screen, have been changed to "GUIs (graphical user interfaces)", which have implemented graphics-based user inputs. In GUI environments, a desktop, which simulated a computer system, and a large number of icons are prepared on display screens.

On a desktop having a GUI, all resource objects, such as files, handled in a computer system are expressed by icons. The user applies straightforward operations (such as clicking and dragging and dropping) to the icons, which express programs, data, folders, devices, and others on the display screen, by using a mouse or others to displayed objects on the screen. In this way, computer operations can be intuitively performed. On the desktop, buttons, such as a menu bar and a tool box, for instantaneously calling various functions, that is, computer processing, are prepared. Command input forms have become more intuitive and easier to understand.

With the introduction of GUI environments, the user can appropriately operate a computer without learning the names of commands and a command operation method or performing troublesome key inputs.

As typical user input apparatuses which can be used in such GUI environments, there are coordinate specifying apparatuses, such as a mouse, a track point, a joystick, a tablet, and a touch sensitive pad. Among them, the mouse has been widely used in the computer industry, and most users are familiar with mouse operations typical of which is a drag and drop operation. It can be said that there is no need to perform training for mouse operations when a computer is newly introduced to an office or a house in daily life scene. GUIs based on mouse operations have already become established among many users, and provide a plurality of general-purpose functions.

In GUI environments, the user can interactively perform input operations to a computer in an easy-to-understand manner while guided by a content displayed on a computer screen. As a case in which such interactive inputs have further advanced, there is a user input apparatus using a touch sensitive panel. In this case, since a touch sensitive panel, which reads the coordinates of a point specified by a pen or the tip of a user's finger, is superposed on the screen, the user does not need to turn the user's eyes from the screen, unlike a case in which mouse operations are used. In addition, since the user can directly specify a desired displayed object by the tip of a user's finger, operability is further improved.

When a conventional touch sensitive panel is used for user inputs, however, the user needs to actually touch the surface of the touch sensitive panel by the tip of a user's finger.

If there are two or more contact points on the panel, the positions thereof cannot be independently measured. When a plurality of users is positioned around the touch sensitive panel in a meeting, for example, the tips of fingers of a plurality of participants may touch the touch sensitive panel at the same time. The system cannot recognize such a condition. The system may recognize the first touch only, or may confuse the plurality of touches.

User inputs with the conventional touch sensitive panel are based on the inputs of point information. The shape of an object approaching or the information of the distance to the tip of an approached finger cannot be recognized.

DISCLOSURE OF INVENTION

An object of the present invention is to provide a good user input apparatus allowing the user to perform input operations by using part of the user's body as with a keyboard or a mouse, a computer connected to the user input apparatus and a control method for the computer connected to the user input apparatus, and a storage medium.

Another object of the present invention is to provide a good user input apparatus allowing the user to perform input operations without inconvenience even if the user cannot use one hand due to other work while the apparatus is designed such that the user operates the apparatus by both hands, a computer connected to the user input apparatus and a control method for the computer connected to the user input apparatus, and a storage medium.

Another object of the present invention is to provide a good user input apparatus allowing the user to perform object operations and to input commands to a computer by directly using the tip of a user's finger.

Another object of the present invention is to provide a good user input apparatus allowing the user to perform object operations and to input commands to a computer in a non-contact manner.

Another object of the present invention is to provide a good non-contact-type user input apparatus allowing the information of two or more points, the shape of an approaching object, and the information of the distance to an object to be recognized.

The present invention has been made in consideration of the above-described issues. A first aspect of the present invention is a user input apparatus for receiving data or a command input by the user to a computer, and the user input apparatus is characterized by including:

user input means for the user to input data or a command by using the user's human body; and use-form detection means for detecting a form in which the user uses the user input means by the user's human body.

The use-form detection means can, for example, determine whether the form in which the user uses the user input means by the user's human body is a usual mode or an unusual mode.

The computer connected to the user input apparatus can change the operation of the application being executed by the application execution means, according to a detection result obtained by the use-form detection means.

When the user input means is a keyboard, for example, the use-form detection means can determine whether the user is using the keyboard in a usual mode in which the user can perform key inputs by using both hands or in an unusual mode in which the user can perform key inputs by using one hand only.

When the user input means is a mouse, for example, the use-form detection means can determine whether a mouse operation mode in which the user can operate the mouse by using at least one hand or a mouse non-operation mode in which the user releases a user's hand from the mouse so that the user cannot operate the mouse is used.

When the user input means is formed of a combination of a keyboard and a mouse, for example, the use-form detection means can determine whether a first use mode in which the user can perform key inputs by using both hands or a second use mode in which the user uses the mouse by one hand and can perform key inputs only by the other hand is used.

The use-form detection means can determine whether an another-terminal use mode in which the user is using a portable telephone or another information terminal by using at least one hand is used.

Use-form detection means which detects a form in which the user uses a system through a user input apparatus such as a keyboard can, for example, include a transmission electrode disposed almost at the center of the keyboard, a transmitter for supplying alternating current for transmission to the transmission electrode, a first receiving electrode disposed almost at the left end of the keyboard, a second receiving electrode disposed almost at the right end of the keyboard, a first receiver for receiving alternating current flowing through the first receiving electrode, and a second receiver for receiving alternating current flowing through the second receiving electrode.

In such a case, a first capacitor-equivalent circuit equivalent to a capacitor is formed between the transmission electrode and the first receiving electrode, and a second capacitor-equivalent circuit equivalent to a capacitor is formed between the transmission electrode and the second receiving electrode; and a first subordinate capacitor-equivalent circuit is formed in parallel to the first capacitor-equivalent circuit when a human body approaches the left-hand side of the keyboard, or a second subordinate capacitor-equivalent circuit is formed in parallel to the second capacitor-equivalent circuit when a human body approaches the right-hand side of the keyboard. Therefore, it can determined whether the user is using the left-hand side and/or right-hand side of the keyboard, according to a change in alternating current flowing through the first or second capacitor-equivalent circuit, the change caused by a change in the capacitance of the first subordinate or second subordinate capacitor-equivalent circuit, generated according to the extent of approaching of the human body.

Use-form detection means which detects a form in which the user uses a system through a user input apparatus such as a mouse can, for example, include a transmission electrode disposed almost at one end of the mouse, a transmitter for supplying alternating current for transmission to the transmission electrode, a receiving electrode disposed almost at the other end of the mouse, and a receiver for receiving alternating current flowing through the receiving electrode.

In such a case, a first capacitor-equivalent circuit equivalent to a capacitor is formed between the transmission electrode and the receiving electrode, and a second capacitor-equivalent circuit is formed in parallel to the first capacitor-equivalent circuit when a human body approaches the upper surface of the mouse. Therefore, it can determined whether the user is using the mouse, according to a change in alternating current flowing through the first capacitor-equivalent circuit, the change caused by a change in the capacitance of the second capacitor-equivalent circuit, generated according to the extent of approaching of the human body.

The use-form detection means can include modulation means for modulating the original signal to generate an output signal, transmission means formed of a first electrically conductive member and disposed on the user input means so as to be exposed to the outside to be able to transmit the output signal, receiving means formed of a second electrically conductive member and disposed on an external unit so as to be exposed to the outside to be able to receive the output signal, and demodulation means for demodulating the received signal. In such a case, it can be determined that the user is also using the external unit by using a fact that signal transfer between the transmission means and the receiving means is enabled by the contacts of a human body to the first and second electrically conductive members.

The user input means is, for example, a keyboard, and the external unit is, for example, an information terminal, such as a portable telephone. In such a case, the use-form detection means can determine that one hand of the user is placed on the keyboard and the other hand is used to hold the information terminal, through the signal transfer between the transmission means and the receiving means.

Alternatively, the use-form detection means can be formed of a plurality of line-shaped transmission electrodes, a transmitter for supplying alternating current for transmission to each of the transmission electrodes, a plurality of line-shaped receiving electrodes disposed so as not to contact each of the transmission electrodes, and a receiver for receiving alternating current flowing through the receiving electrodes. A use-form detection area where the plurality of transmission electrodes and the plurality of receiving electrodes intersect is superposed on a user input area of the user input apparatus, a first capacitor-equivalent circuit equivalent to a capacitor is formed at each of the intersections of the transmission electrodes and the receiving electrodes, and a second capacitor-equivalent circuit is formed in parallel to the first capacitor-equivalent circuit when a human body approaches the intersection of a transmission electrode and a receiving electrode.

In such a case, the form of use in which the user uses the user input means by the user's human body can be detected according to a change in alternating current flowing through the first capacitor-equivalent circuit, the change caused by a change in the capacitance of the second capacitor-equivalent circuit, generated according to the extent of approaching of the human body.

Such a use-form detection means can detect a multidimensional value formed of an output obtained at each intersection in response to an operation applied by the user's human body to the user input means.

A second aspect of the present invention is a computer connected to a user input apparatus for the user to input data or a command by using the human body, and the computer connected to the user input apparatus is characterized by including:

application execution means for executing a predetermined application;

use-form detection means for detecting a form in which the user uses the user input apparatus by the user's human body; and operation control means for changing the operation of the application being executed by the application execution means, according to a detection result obtained by the use-form detection means.

The use-form detection means can determine whether the form in which the user uses the user input apparatus by the user's human body is a usual mode or an unusual mode. The operation control means can switch an assignment to an input content sent from the user input apparatus, in response to the detection of the unusual mode by the use-form detection means.

The user input apparatus may be a keyboard. In such a case, the operation control means may switch an assignment to each key on the keyboard in response to the detection of a use form in which the user can perform key inputs by using one hand only, by the use-form detection means.

Or, the user input apparatus may be formed of a combination of a keyboard and a mouse. In such a case, the use-form detection means may determine whether a first use mode in which the user can perform key inputs by using both hands or a second use mode in which the user uses the mouse by the left hand and can perform key inputs only by the other hand is used. The operation control means may assign a usual text character to each key of the keyboard in the first use mode, and command functions to left-hand-operation keys of the keyboard in the second use mode.

Alternatively, the use-form detection means may determine whether an another-terminal use mode in which the user is using a portable telephone or another information terminal by using at least one hand. In such a case, the operation control means can activate an application for driving the another terminal in response to the detection of the another-terminal use mode by the use-form detection means.

When the user input apparatus is a keyboard, the use-form detection means can be formed of a transmission electrode disposed almost at the center of the keyboard, a transmitter for supplying alternating current for transmission to the transmission electrode, a first receiving electrode disposed almost at the left end of the keyboard, a second receiving electrode disposed almost at the right end of the keyboard, a first receiver for receiving alternating current flowing through the first receiving electrode, and a second receiver for receiving alternating current flowing through the second receiving electrode. A first capacitor-equivalent circuit equivalent to a capacitor is formed between the transmission electrode and the first receiving electrode, and a second capacitor-equivalent circuit equivalent to a capacitor is formed between the transmission electrode and the second receiving electrode; and a first subordinate capacitor-equivalent circuit is formed in parallel to the first capacitor-equivalent circuit when a human body approaches the left-hand side of the keyboard, or a second subordinate capacitor-equivalent circuit is formed in parallel to the second capacitor-equivalent circuit when a human body approaches the right-hand side of the keyboard.

Therefore, it can determined whether a first use mode in which the user can perform key inputs by using both hands or a second use mode in which the user can perform key inputs by using the left hand only is used, according to a change in the alternating current flowing through the first or second capacitor-equivalent circuit, the change caused by a change in the capacitance of the first subordinate or second subordinate capacitor-equivalent circuit, generated according to the extent of approaching of the human body. The operation control means can assign a usual text character to each key of the keyboard in the first use mode, and command functions to left-hand-operation keys of the keyboard in the second use mode.

When the user input means is formed of a combination of a keyboard and a mouse, the use-form detection means can be formed of a transmission electrode disposed almost at one end of the mouse, a transmitter for supplying alternating current for transmission to the transmission electrode, a receiving electrode disposed almost at the other end of the mouse, and a receiver for receiving alternating current flowing through the receiving electrode. A first capacitor-equivalent circuit equivalent to a capacitor is formed between the transmission electrode and the receiving electrode, and a second capacitor-equivalent circuit is formed in parallel to the first capacitor-equivalent circuit when a human body approaches the upper surface of the mouse.

Therefore, it can be determined whether the user is using the mouse, according to a change in alternating current flowing through the first capacitor-equivalent circuit, the change caused by a change in the capacitance of the second capacitor-equivalent circuit, generated according to the extent of approaching of the human body. The operation control means can assign command functions to left-hand-operation keys of the keyboard when it is determined that the user is using the mouse.

Alternatively, the use-form detection means can be formed of modulation means for modulating the original signal to generate an output signal, transmission means formed of a first electrically conductive member and disposed on the user input means so as to be exposed to the outside to be able to transmit the output signal, receiving means formed of a second electrically conductive member and disposed on an external unit so as to be exposed to the outside to be able to receive the output signal, and demodulation means for demodulating the received signal.

In such a case, the use-form detection means can determine that the user is using the external unit when signal transfer between the transmission means and the receiving means is enabled by the contacts of a human body to the first and second electrically conductive members. Therefore, the operation control means can activate an application for the external unit when the use-form detection means detects the use of the external unit.

Alternatively, the use-form detection means can be formed of a plurality of line-shaped transmission electrodes, a transmitter for supplying alternating current for transmission to each of the transmission electrodes, a plurality of line-shaped receiving electrodes disposed so as not to contact each of the transmission electrodes, and a receiver for receiving alternating current flowing through the receiving electrodes. A use-form area where the plurality of transmission electrodes and the plurality of receiving electrodes intersect is superposed on a user input area of the user input apparatus, a first capacitor-equivalent circuit equivalent to a capacitor is formed at each of the intersections of the transmission electrodes and the receiving electrodes, and a second capacitor-equivalent circuit is formed in parallel to the first capacitor-equivalent circuit when a human body approaches the intersection of a transmission electrode and a receiving electrode. Therefore, the use-form detection means can detect the form of use in which the user uses the user input apparatus by the user's human body as a multi-dimensional value formed of an output obtained at each intersection, according to a change in alternating current flowing through the first capacitor-equivalent circuit, the change caused by a change in the capacitance of the second capacitor-equivalent circuit, generated according to the extent of approaching of the human body. Therefore, the operation control means can, for example, execute, as processing which uses the multi-dimensional value, using authentication processing by comparing and verifying a specified input operation performed by the user and a multi-dimensional value detected in the specified operation.

A third aspect of the present invention is a control method for a computer connected to a user input apparatus for the user to input data or a command by using the human body, and the control method for a computer connected to a user input apparatus is characterized by including a use-form detection step of detecting a form in which the user uses the user input apparatus by the user's human body, and an operation control step of changing the operation of the application being executed by the application execution means, according to a detection result obtained in the use-form detection step.

In the control method for a computer, according to the third aspect of the present invention, it is possible that, in the use-form detection step, it is determined whether the form in which the user uses the user input apparatus by the user's human body is a usual mode or an unusual mode, and in the operation control step, an assignment to an input content sent from the user input apparatus is switched in response to the detection of the unusual mode in the use-form detection step.

When the user input apparatus is a keyboard, for example, an assignment to each key on the keyboard can be switched in the operation control step in response to the detection of a use form in which the user can perform key inputs by using one hand only, in the use-form detection step.

Alternatively, when the user input apparatus is formed of a combination of a keyboard and a mouse, the control method may be configured such that, in the use-form detection step, it is determined whether a first use mode in which the user can perform key inputs by using both hands or a second use mode in which the user uses the mouse by the left hand and can perform key inputs only by the other hand is used, and in the operation control step, a usual text character is assigned to each key of the keyboard in the first use mode, and command functions are assigned to left-hand-operation keys of the keyboard in the second use mode.

In the use-form detection step, it may be determined whether an another-terminal use mode in which the user is using a portable telephone or another information terminal by using at least one hand is used. In such a case, in the operation control step, an application for driving the another terminal can be activated in response to the detection of the another-terminal use mode in the use-form detection step.

In the use-form detection step, the form of use in which the user uses the user input apparatus by the user's human body may be detected as a multi-dimensional value. In such a case, in the operation control step, as processing which uses the multi-dimensional value, user authentication processing can be executed by comparing and verifying a specified input operation performed by the user and a multi-dimensional value detected in the specified input operation.

A fourth aspect of the present invention is a storage medium having physically stored thereon in a computer readable manner computer software described so as to execute, in a computer system, information processing according to the form of use of the user for a user input apparatus used by the user to input data or a command by using the human body, and the computer software is characterized by including:

a use-form detection step of detecting a form in which the user uses the user input apparatus by the user's human body, and an operation control step of changing the operation of the application being executed by the application execution means, according to a detection result obtained in the use-form detection step.

Storage media according to the fourth aspect of the present invention are, for example, media that provide in a computer readable form computer software for general-purpose computer systems that can execute various types of program code. Such storage media includes portable storage media which can be detachable, such as CDs (compact discs), FDs (flexible disks), and MOs (magneto-optical discs). Alternatively, it is technically possible that the computer software is provided for specific computer systems through transfer media such as networks (irrespective of whether the networks use radio or wire).

Such storage media define the structural or functional cooperation relationship between predetermined computer software and the storage media in order to implement the functions of the computer software in computer systems. In other words, when the predetermined computer software is installed into a computer system through a storage medium according to the fourth aspect of the present invention, a cooperation effect is obtained in the computer system, and the same advantages are obtained as those obtained by a computer according to the second aspect of the present invention or by a control method for a computer, according to the third aspect of the present invention.

A fifth aspect of the present invention is a non-contact user input apparatus for inputting in a non-contact manner by using a user's finger tip or others, and the non-contact user input apparatus is characterized by including:

a plurality of line-shaped transmission electrodes;

a transmitter for supplying alternating current for transmission to each of the transmission electrodes;

a plurality of line-shaped receiving electrodes disposed so as not to contact each of the transmission electrodes; and a receiver for receiving alternating current flowing through the receiving electrodes; and characterized in that a circuit equivalent to a capacitor is formed at each of the intersections of the transmission electrodes and the receiving electrodes.

In a non-contact user input apparatus having such a structure, a first capacitor-equivalent circuit equivalent to a capacitor is virtually formed at each of the intersections of the transmission electrodes and the receiving electrodes.

A second capacitor-equivalent circuit is virtually formed in parallel to the first capacitor-equivalent circuit when an electrically conductive object, including a user's finger tip, approaches.

The capacitance of the second capacitor-equivalent circuit is changed according to the extent of approaching of the electrically conductive object, including a finger tip. Therefore, alternating current flowing through the first capacitor-equivalent circuit connected in parallel to the second capacitor-equivalent circuit is changed in the same way according to the extent of approaching of the electrically conductive object, including a finger tip. With such a phenomenon being used, the non-contact user input apparatus can detect the contact of the finger tip and also measure the distance to the approached finger tip.

The transmitter may further include a signal processing section for scanning the transmission electrodes by alternating current to detect an input position according to the positional relationship between a transmission electrode to which alternating current was sent and a receiving electrode that received alternating current.

In such a case, the non-contact user input apparatus can measure the outline of an approaching object by tracing the intersections of transmission electrodes and receiving electrodes where input positions are detected. In other words, the non-contact user input apparatus can detect approaching of an object, including a user's finger tip, and also recognize the outline of the object. Even when two or more users attempt to access the non-contact user input apparatus at the same time, finger tips of the users can be separately recognized.

The transmitter may apply alternating current to the transmission electrodes while scanning the electrodes by the alternating current. The non-contact user input apparatus may further include a signal processing section for detecting an input position according to the positional relationship between a transmission electrode to which alternating current was sent and a receiving electrode that received alternating current.

By using the difference between the capacitance of a first virtual capacitor formed at the intersection of a transmission electrode and a receiving electrode, and the capacitance of a second virtual capacitor formed when an electrically conductive object, including a user's finger tip, approaches the intersection of the transmission electrode and the receiving electrode, the signal processing section can determine that the electrically conductive object has approached.

The signal processing section can detect the position of an electrically conductive object, including a user's finger tip, by integrating the capacitance of each capacitor virtually formed between the electrically conductive object and each electrode.

At least a user input area where the plurality of transmission electrodes and the plurality of receiving electrodes intersect, in a non-contact user input apparatus according to the present invention is superposed on the display screen of a display apparatus to form a display-integrated user input apparatus. For example, non-contact user input apparatuses according to the present invention can be structured integratedly with liquid-crystal displays and organic LEDs.

For example, a non-contact user input apparatus according the present invention may be structured integratedly with a display apparatus where an anode layer and a cathode layer are stacked with an insulating layer disposed therebetween.

In such a case, a user input area can be structured where the plurality of transmission electrodes and the plurality of receiving electrodes intersect, by a combination of one electrode layer and the other electrode layer. In other words, an alternating voltage for detection needs to be applied to one electrode layer to which a direct voltage is applied and received alternating current needs to be detected at the other electrode layer.

Other objects, features, and advantages of the present invention will be made clear by embodiments of the present invention, described later, and a detailed description based on the accompanying drawings.

BEST MODE FOR CARRYING OUT THE INVENTION

Figure 1:
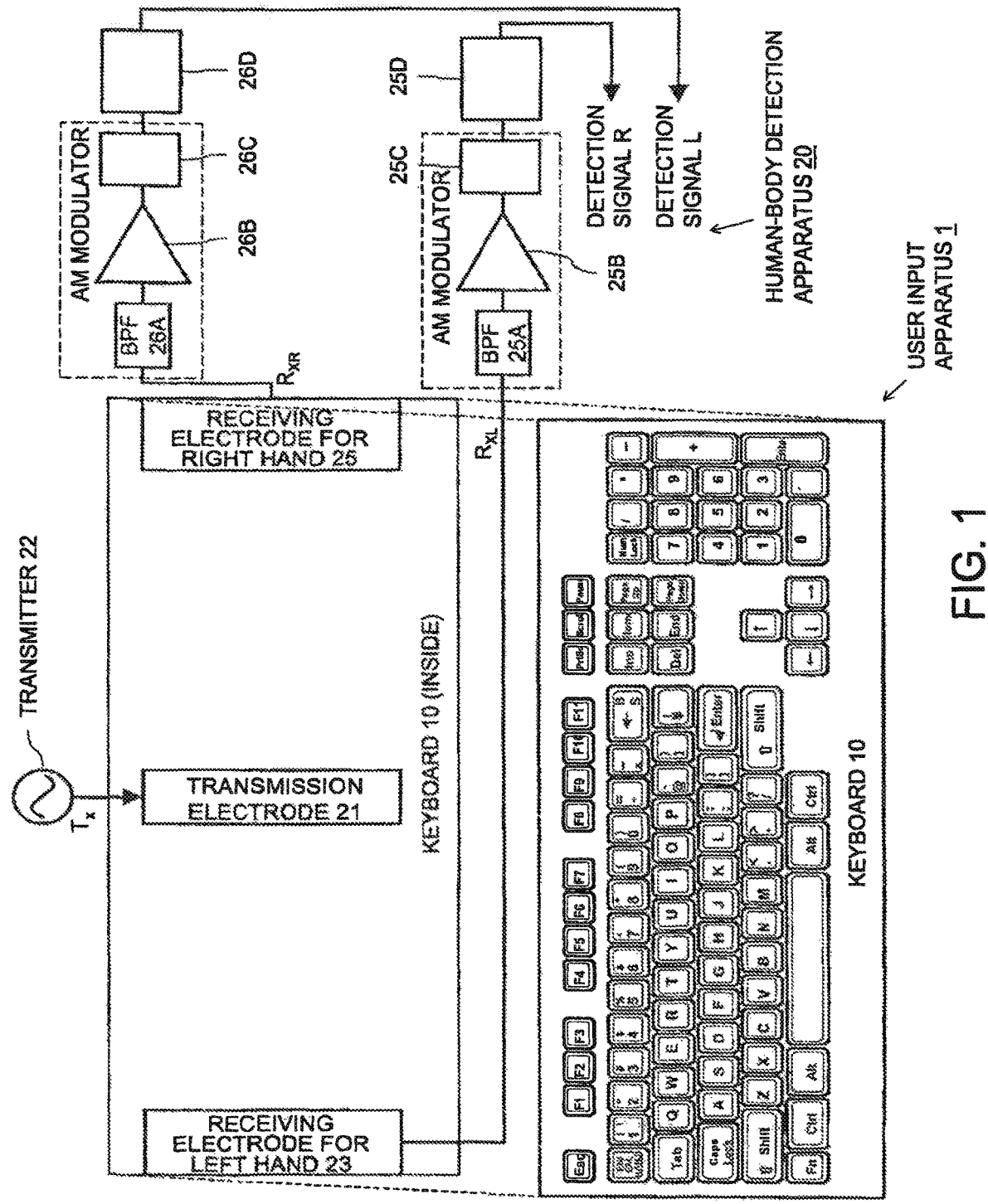
FIG. 1 is a view showing the basic structure of a user input apparatus 1 according to one embodiment of the present invention in a sketch manner.

Embodiments of the present invention will be described below in detail by referring to the drawings.

A. User Input Apparatus

FIG. 1 shows the basic structure of a user input apparatus 1 according to an embodiment of the present invention in a sketch manner. The user input apparatus 1 can be connected, for example, to a computer (not shown) having a general hardware structure, as one peripheral apparatus. The user can input desired data and commands to a computer (not shown in FIG. 1) through the user input apparatus 1.

In the case shown in the figure, the user input apparatus 1 has a structure in which a human-body detection apparatus 20 for recognizing the right hand and the left hand of the user on or above a general keyboard 10 provided, for example, with a "QWERTY" arrangement key group, for receiving text-based user inputs is incorporated inside the keyboard 10. A computer connected to the user input apparatus 1 can change the system state and an application processing operation in response to the result of recognition of whether the right hand and the left hand are disposed on the keyboard 10, as described later.

The human-body detection apparatus 20 according to the present embodiment is formed of a transmission electrode 21 disposed almost at the center of the keyboard 10, a transmitter 22 for supplying an alternating-current signal $T_x$ (having a frequency of 100 kHz, for example) for transmission to the transmission electrode 21, a left-hand-detection receiving electrode 23 disposed almost at the left end of the keyboard 10, a right-hand-detection receiving electrode 24 disposed almost at the right end of the keyboard 10, a left-hand-detection receiver 25 for receiving alternating current flowing through the receiving electrode 23, and a right-hand-detection receiver 26 for receiving alternating current flowing through the receiving electrode 24.

The left-hand-detection receiver 25 includes an AM modulator formed of a band-pass filter (BPF) 25A for passing alternating current in a predetermined frequency band only, in a signal $R_{XL}$ received by the receiving electrode 23, an amplifier 25B, and a detector 25C, and an A/D converter 25D for converting a detection output to a digital signal.

The right-hand-detection receiver 26 includes an AM modulator formed of a band-pass filter (BPF) 26A for passing alternating current in a predetermined frequency band only, in a signal $R_{XR}$ received by the receiving electrode 24, an amplifier 26B, and a detector 26C, and an A/D converter 26D for converting a detection output to a digital signal.

In the human-body detection apparatus 20 having the above-described structure, a circuit equivalent to a capacitor is formed between the transmission electrode 21 and the left-hand-detection receiving electrode 23, and in the same way, a circuit equivalent to a capacitor is formed between the transmission electrode 21 and the right-hand-detection receiving electrode 24.

When the left hand of the user approaches a predetermined position (that is, the left-hand half) of the upper surface of the keyboard, for example, a virtual circuit equivalent to a capacitor is formed in parallel to the above-described left-hand-side circuit equivalent to a capacitor. Therefore, by using a change of the capacitance of the virtual capacitor formed when the left hand of the user approaches, it can be determined whether the left hand of the user is disposed above the keyboard 10. In the same way, when the left hand of the user approaches a predetermined position (that is, the left-hand half) of the upper surface of the keyboard, for example, a virtual circuit equivalent to a capacitor is formed in parallel to the above-described right-hand-side circuit equivalent to a capacitor. Therefore, by using a change of the capacitance of the virtual capacitor formed when the right hand of the user approaches, it can be determined whether the right hand of the user is disposed above the keyboard 10.

Figure 2:
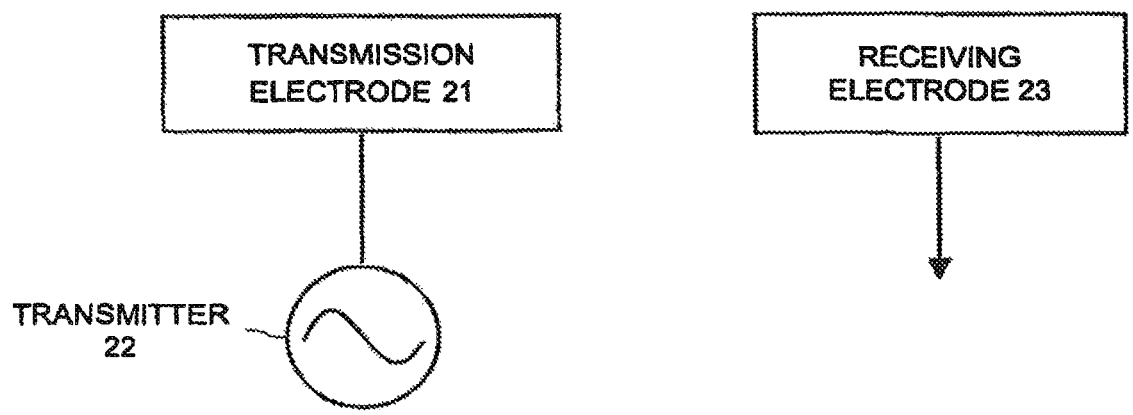
FIG. 2 is a view for describing a principle for detecting a human body (for example, a user's hand) by an electrostatic effect generated between a transmission electrode 21 and a left-hand-detection receiving electrode 23.
Figure 3:
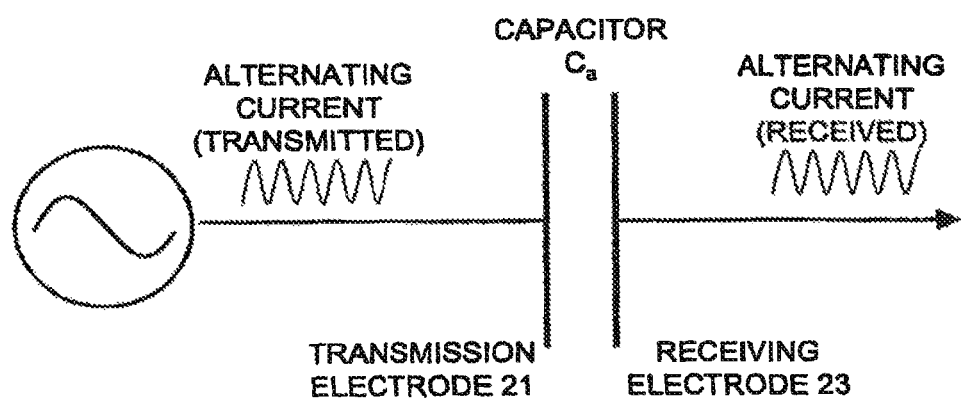
FIG. 3 is a view for describing the principle for detecting a human body (for example, a user's hand) by the electrostatic effect generated between the transmission electrode 21 and the left-hand-detection receiving electrode 23.

FIG. 2 shows the transmission electrode 21 and the left-hand-detection receiving electrode 23 only, in the human-body detection apparatus 20 according to the present embodiment. FIG. 3 shows an equivalent circuit formed between the transmission electrode 21 and the left-hand-detection receiving electrode 23.

The circuit equivalent to a capacitor is formed between the transmission electrode 21 and the left-hand-detection receiving electrode 23, as shown in FIG. 3.

When an alternating voltage having a frequency of about 100 kHz is applied to the transmission electrode 21, for example, a capacitor $C_a$ generates capacitive coupling between the transmission electrode 21 and the receiving electrode 23, and alternating current is generated at the receiving electrode 23. The intensity of the current passing through the capacitor $C_a$ is taken out as digital data by applying signal processing at the band-pass filter 25A which has tuned in to the oscillation frequency of the alternating voltage generated at the transmitter 22, the amplifier 25B, the detector 25C, and the A/D converter 25D. The intensity of the alternating current received by the receiving electrode 23 in this case only depends on the capacitance $C_a$ of the capacitor.

The capacitance $C_a$ is static and fixed unless the transmission electrode 21 or the receiving electrode 23 is deformed. Therefore, as long as the same alternating voltage is applied to the transmission electrode 21, the intensity of the alternating current received by the receiving electrode 23 is constant.

A mechanism for detecting a human body such as the left hand of the user by using a combination of the transmission electrode 21 and the receiving electrode 23 will be described next.

Figure 4:
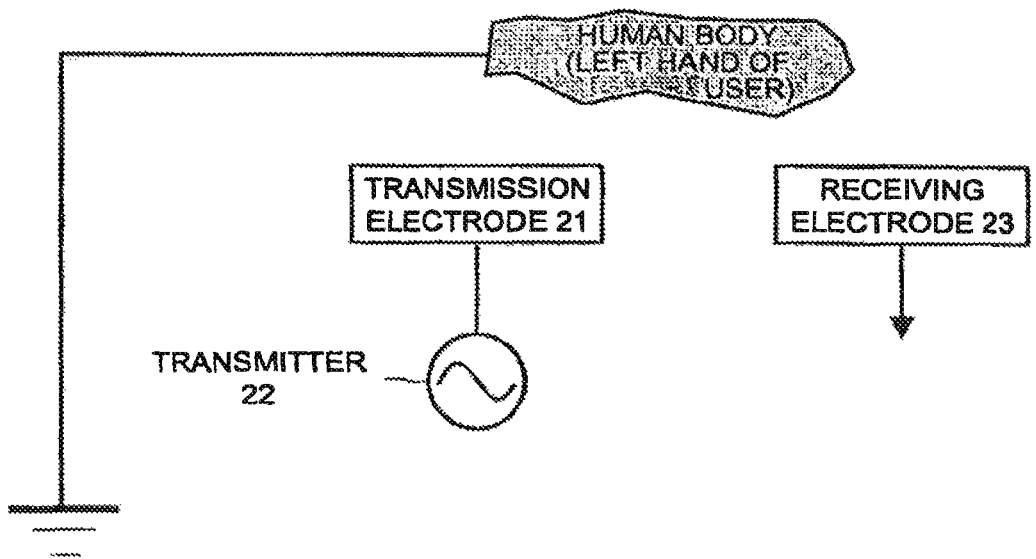
FIG. 4 is a view for describing the principle for detecting a human body (for example, a user's hand) by the electrostatic effect generated between the transmission electrode 21 and the left-hand-detection receiving electrode 23.
Figure 5:
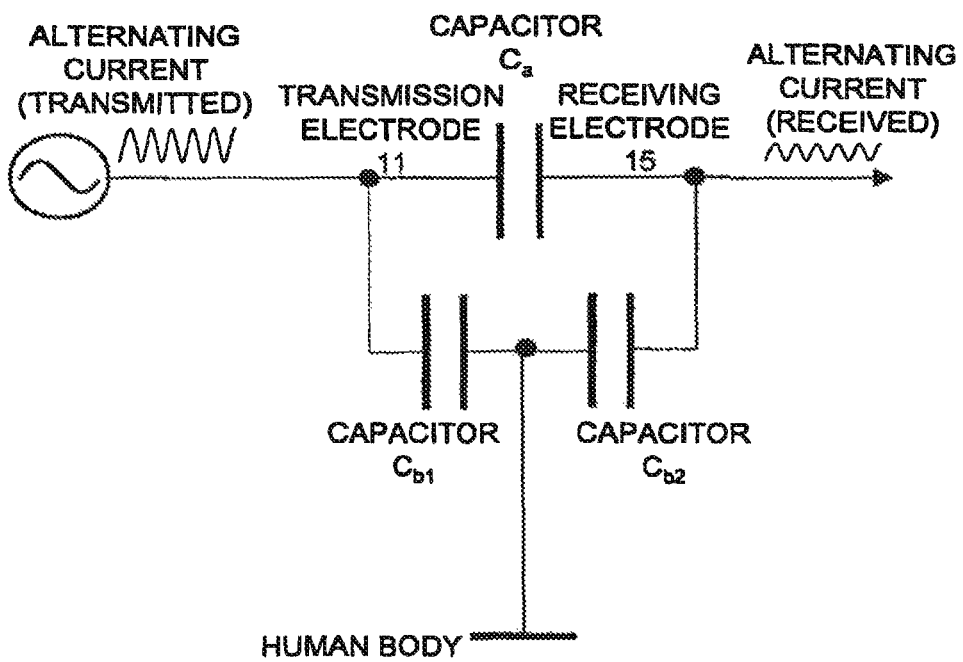
FIG. 5 is a view for describing the principle for detecting a human body (for example, a user's hand) by the electrostatic effect generated between the transmission electrode 21 and the left-hand-detection receiving electrode 23.

FIG. 4 shows in a sketch manner that the left hand of the user approaches the left-hand side above the input surface of the keyboard 10, that is, between the transmission electrode 21 and the receiving electrode 23. FIG. 5 shows an equivalent circuit generated between the transmission electrode 21 and the receiving electrode 23 when the left hand of the user approaches between the transmission electrode 21 and the receiving electrode 23.

As described above, the circuit equivalent to the capacitor $C_a$ is formed between the transmission electrode 21 and the receiving electrode 23.

A human body, such as the left hand of the user, can be regarded as a virtual grounding point (ground). Therefore, the equivalent circuit has a structure in which the capacitor $C_a$ formed between the transmission electrode 21 and the receiving electrode 23 is connected in parallel to virtual capacitors $C_{b1}$ and $C_{b2}$ formed in series, between the human body and the transmission electrode 21 and between the human body and the receiving electrode 23, respectively.

Therefore, when an alternating voltage having a frequency of about 100 kHz, for example, is applied to the transmission electrode 21, alternating current generated by capacitive coupling caused by the capacitance $C_a$ between the transmission electrode 21 and the receiving electrode 23, that is, the intensity of current detected by the receiving electrode 23, is weakened by the amount of current flowing into the ground through the capacitor $C_{b1}$.

The capacitance $C_a$ is static and fixed unless the transmission electrode 21 or the receiving electrode 23 is deformed. In contrast, the capacitance $C_{b1}$ and the capacitance $C_{b2}$ of the virtual capacitors formed in series, between the human body and the transmission electrode 21 and between the human body and the receiving electrode 23, respectively are increased as a human body approaches the left-hand side of the input surface of the keyboard 10, that is, the transmission electrode 21 and the receiving electrode 23. Therefore, when the same alternating voltage is applied to the transmission electrode 21, the intensity of the alternating current detected by the receiving electrode 23 becomes smaller as a human body approaches the left-hand side of the input surface of the keyboard 10.

By using this phenomenon, it can be determined with the use of a received signal which has been AM-modulated by the band-pass filter 25A, the amplifier 25B, and the detector 25C, and further converted to a digital form by the A/D converter 25D whether a human body is disposed close to the transmission electrode 21 and the receiving electrode 23, that is, whether the left hand of the user is using the keyboard 10.

By the same principle as that described above, it can be determined based on an electrostatic effect between the transmission electrode 21 and the right-hand-detection receiving electrode 24 whether a human body is disposed close to the transmission electrode 21 and the right-hand-detection receiving electrode 24, that is, whether the right hand of the user is using the keyboard 10.

Figure 6:
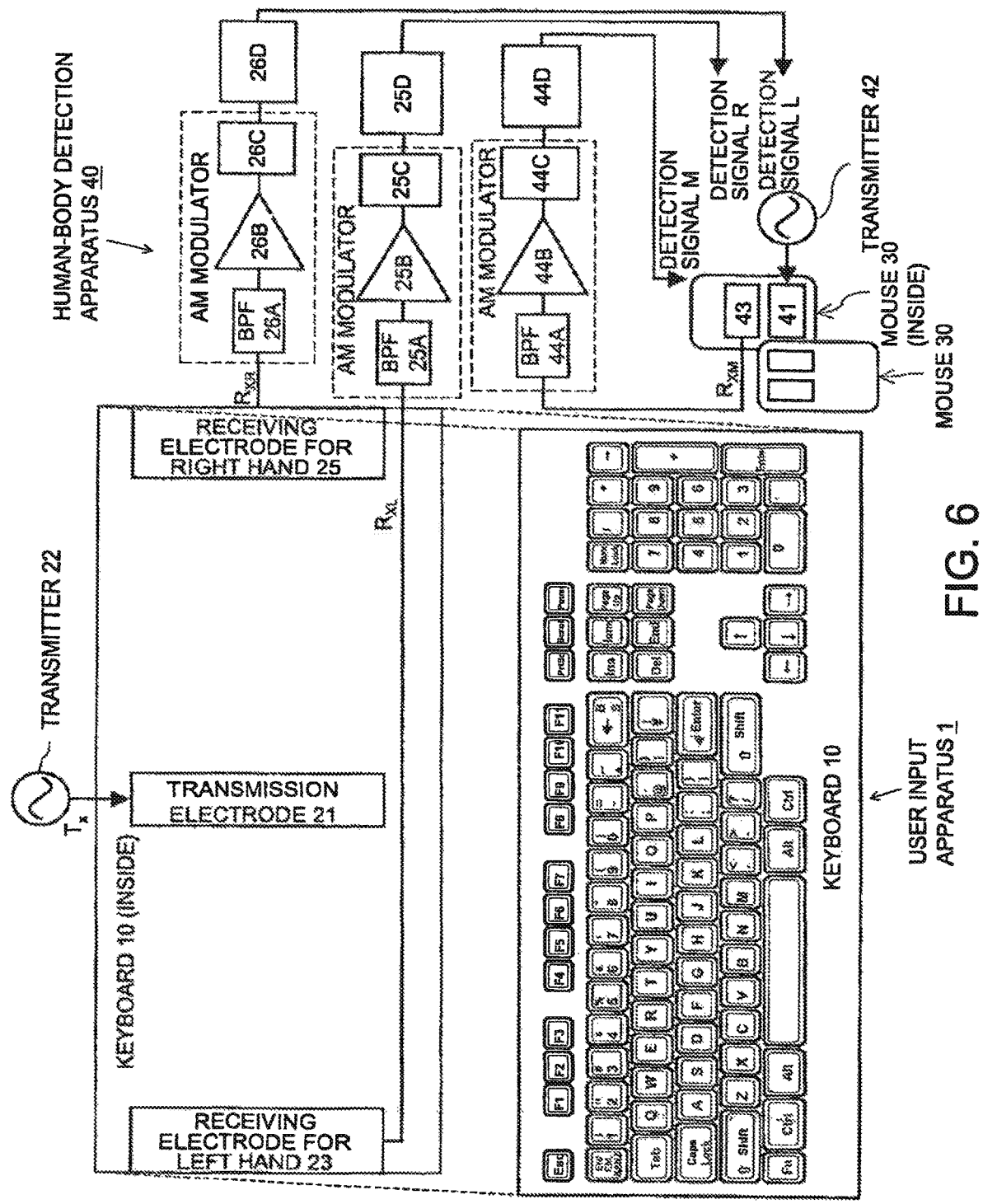
FIG. 6 is a view showing the basic structure of a user input apparatus 1 according to another embodiment of the present invention in a sketch manner.

FIG. 6 shows in a sketch manner the basic structure of a user input apparatus 1 according to another embodiment of the present invention. The user input apparatus 1 according to the present embodiment is formed of a combination of a keyboard 10 and a mouse 30. The keyboard 10 and the mouse 30 can be connected, for example, to a computer (not shown) having a general hardware structure as peripheral apparatuses. The user can input desired data and commands through text-based key inputs on the keyboard 10, and in addition, can input desired data and commands through graphics-based coordinate designation inputs with the mouse 30.

The keyboard 10 has, for example, a general "QWERTY" key arrangement, and a human-body detection apparatus 20 for recognizing the right hand and the left hand of the user on or above the keyboard 10 is incorporated inside the keyboard 10 (below the keyboard input surface). Since the structure and operation characteristics of the human-body detection apparatus 20 are the same as those described above, a description thereof is omitted.

The mouse 30 has therein (not shown) a ball supported so as to rotate freely and a movement sensor for detecting the amounts of movement in the x and y axis directions by the rotation of the ball, and has a general structure in which right and left click buttons are provided at the rear surface. The user puts his or her hand (usually the right hand or the dominant hand) on the rear surface of the mouse 30 to use it.

In the present embodiment, a human-body detection apparatus 40 is built inside the mouse 30. A computer (not shown) connected to the user input apparatus 1, formed of the mouse 30 and the keyboard 10, can change the system state and an application processing operation according to the use of the user input apparatus 1 by automatically detecting a form in which the user operates the mouse 30 and the keyboard 10, as described later.

The human-body detection apparatus 40 according to the present embodiment is formed of a transmission electrode 41 disposed almost at an end of the mouse 30, a transmitter 42 for supplying an alternating-current signal $T_x$ (having a frequency of 100 kHz, for example) for transmission to the transmission electrode 41, a receiving electrode 43 disposed almost at the other end of the mouse 30, and a receiver 44 for receiving alternating current flowing through the receiving electrode 43.

The receiver 44 includes an AM modulator formed of a band-pass filter (BPF) 44A for passing alternating current in a predetermined frequency band only, in a signal $R_{XM}$ received by the receiving electrode 43, an amplifier 44B, and a detector 44C, and an A/D converter 44D for converting a detection output to a digital signal.

In the human-body detection apparatus 40 having the above-described structure, a circuit equivalent to a capacitor is formed between the transmission electrode 41 and the receiving electrode 43.

When the right hand (or the dominant hand) of the user approaches the rear surface of the mouse 30, for example, a virtual circuit equivalent to a capacitor is formed in parallel to the above-described circuit equivalent to a capacitor. Therefore, by using a change of the capacitance of the virtual capacitor formed when the right hand of the user approaches, it can be determined whether the right hand of the user is disposed at the rear surface of the mouse 30, that is, whether the user is not operating the mouse 30.

Since a principle for determining according to an electrostatic effect between the transmission electrode 41 and the receiving electrode 43 whether the user is operating the mouse 30 is almost the same as the mechanism for detecting a user's hand on or above the input surface of the keyboard 10, described by referring to FIG. 2 to FIG. 5, a description thereof is omitted.

In the embodiment shown in FIG. 6, a detection signal L indicating that the user is operating the keyboard 10 by the left hand and a detection signal R indicating that the user is operating the keyboard 10 by the right hand are obtained from the human-body detection apparatus 20, which is incorporated into the keyboard 10. In the same way, a detection signal M indicating that the user is operating the mouse is obtained from the human-body detection apparatus 40, which is incorporated into the mouse 30.

Figure 7:
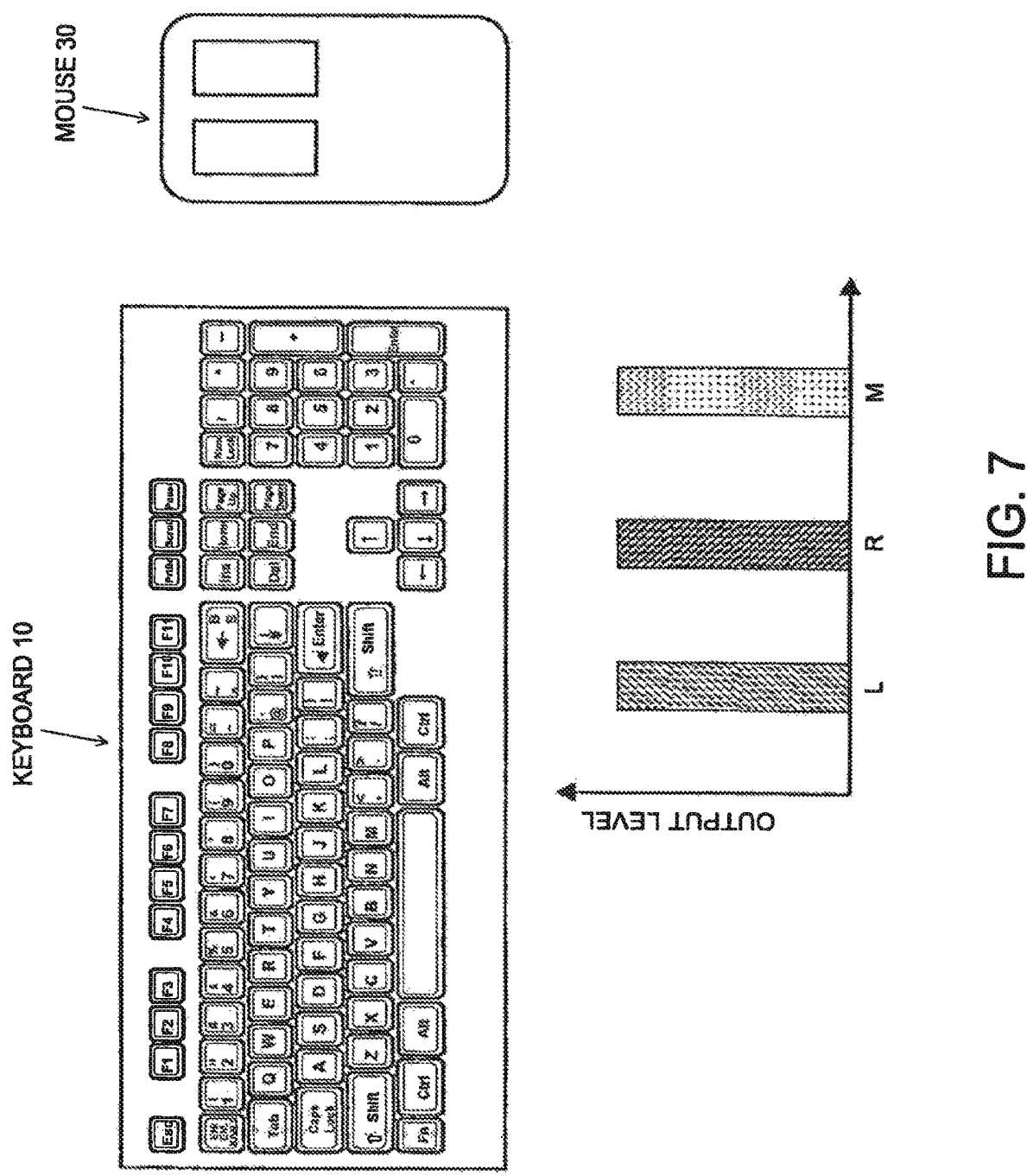
FIG. 7 is a view showing the output levels of detection signals L, R, and M when the user is not operating a keyboard 10 or a mouse 30, in a sketch manner.

FIG. 7 shows in a sketch manner the output levels of the detection signals L, R, and M obtained while the user does not operate (releases) the keyboard 10 and the mouse 30. In this state, since the receiving electrodes can successfully receive alternating-voltage signals sent from the transmission electrodes, the output levels of the detection signals L, R, and M are relatively high.

Figure 8:
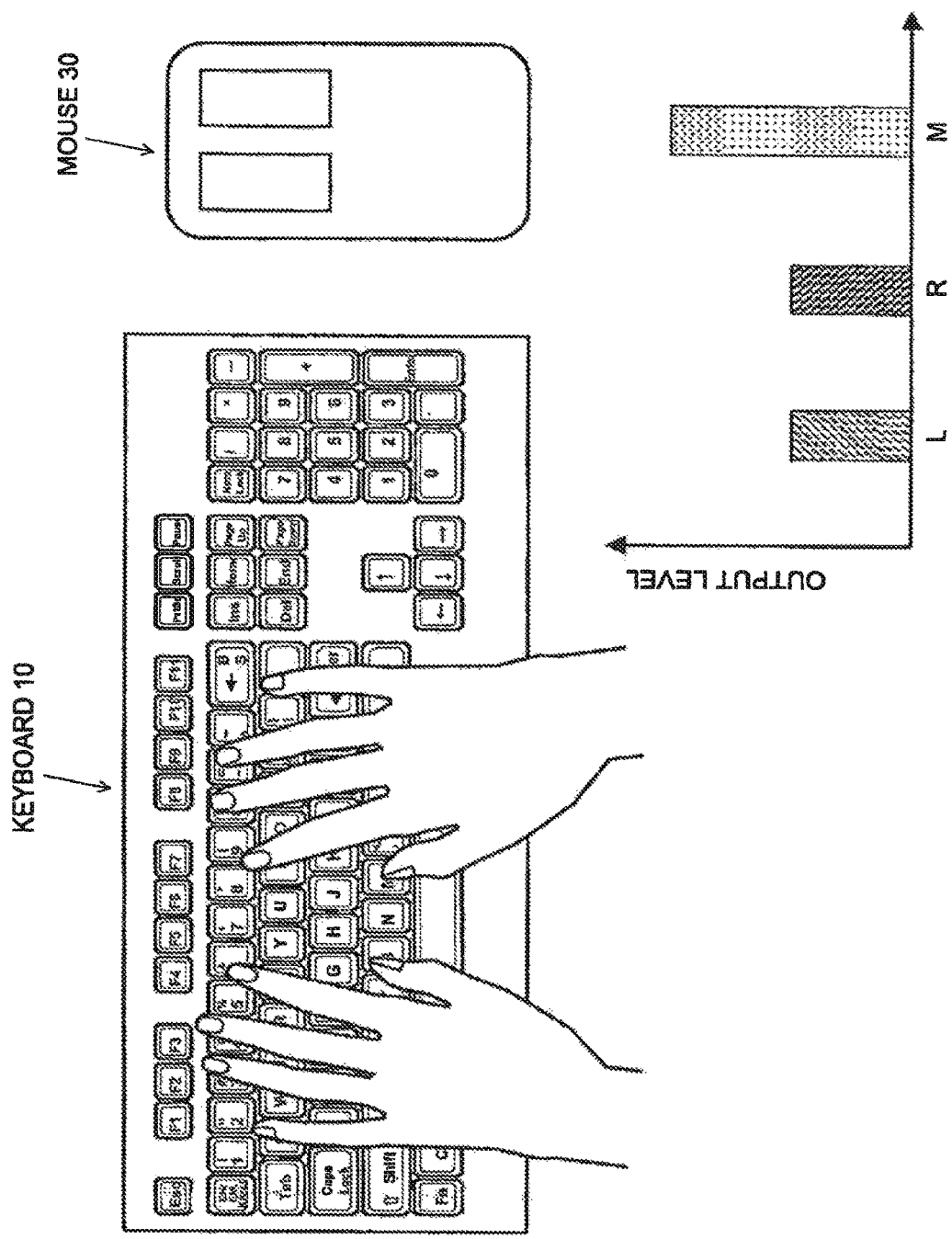
FIG. 8 is a view showing the output levels of the detection signals L, R, and M when the user is operating the keyboard 10 by both hands, in a sketch manner.

FIG. 8 shows in a sketch manner the output levels of the detection signals L, R, and M obtained when the user is operating the keyboard 10 by both hands. In this state, a virtual circuit equivalent to a capacitor is formed between the transmission electrode 21 and each hand of the user. As a result, the levels of the alternating-voltage signals received by the left-hand-detection receiving electrode 23 and the right-hand-detection receiving electrode 25 are reduced. Therefore, the output level of the detection signal M is relatively high, but the output levels of the detection signal L and the detection signal R are reduced.

Figure 9:
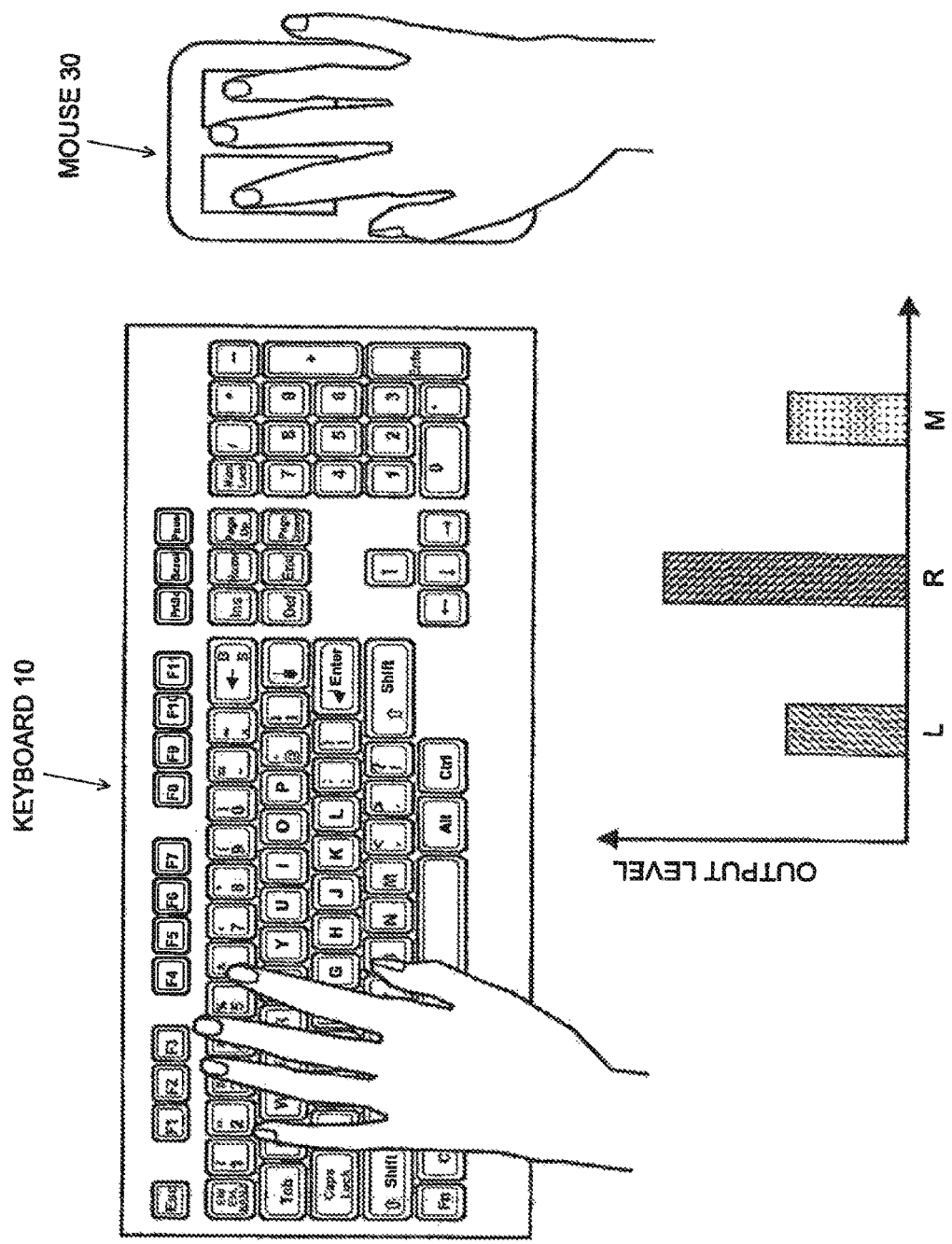
FIG. 9 is a view showing the output levels of the detection signals L, R, and M when the user is operating the keyboard 10 by the left hand and a mouse 30 by the right hand, in a sketch manner.

FIG. 9 shows in a sketch manner the output levels of the detection signals L, R, and M obtained when the user is operating the keyboard 10 by the left hand and the mouse 30 by the right hand. In this state, virtual circuits equivalent to a capacitor are formed between the transmission electrode 21 and the left hand of the user, and between the transmission electrode 31 and the right hand of the user. As a result, the levels of the alternating-voltage signals received by the left-hand-detection receiving electrode 23 and the mouse-operation-detection receiving electrode 33 are reduced. Therefore, the output level of the detection signal R is relatively high, but the output levels of the detection signal L and the detection signal M are reduced.

Figure 10:
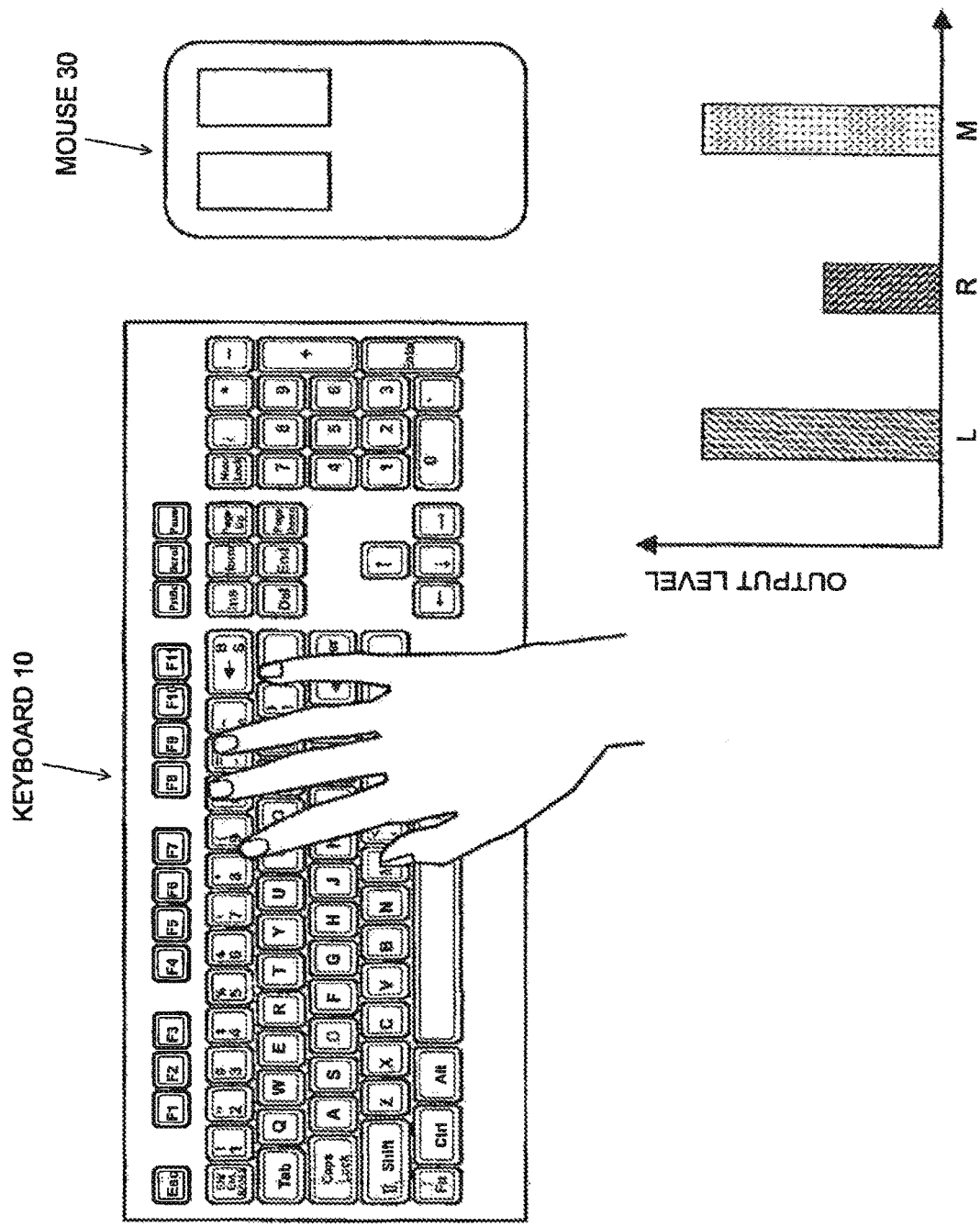
FIG. 10 is a view showing the output levels of the detection signals L, R, and M when the user is operating the keyboard 10 only by the right hand, in a sketch manner.
Figure 11:
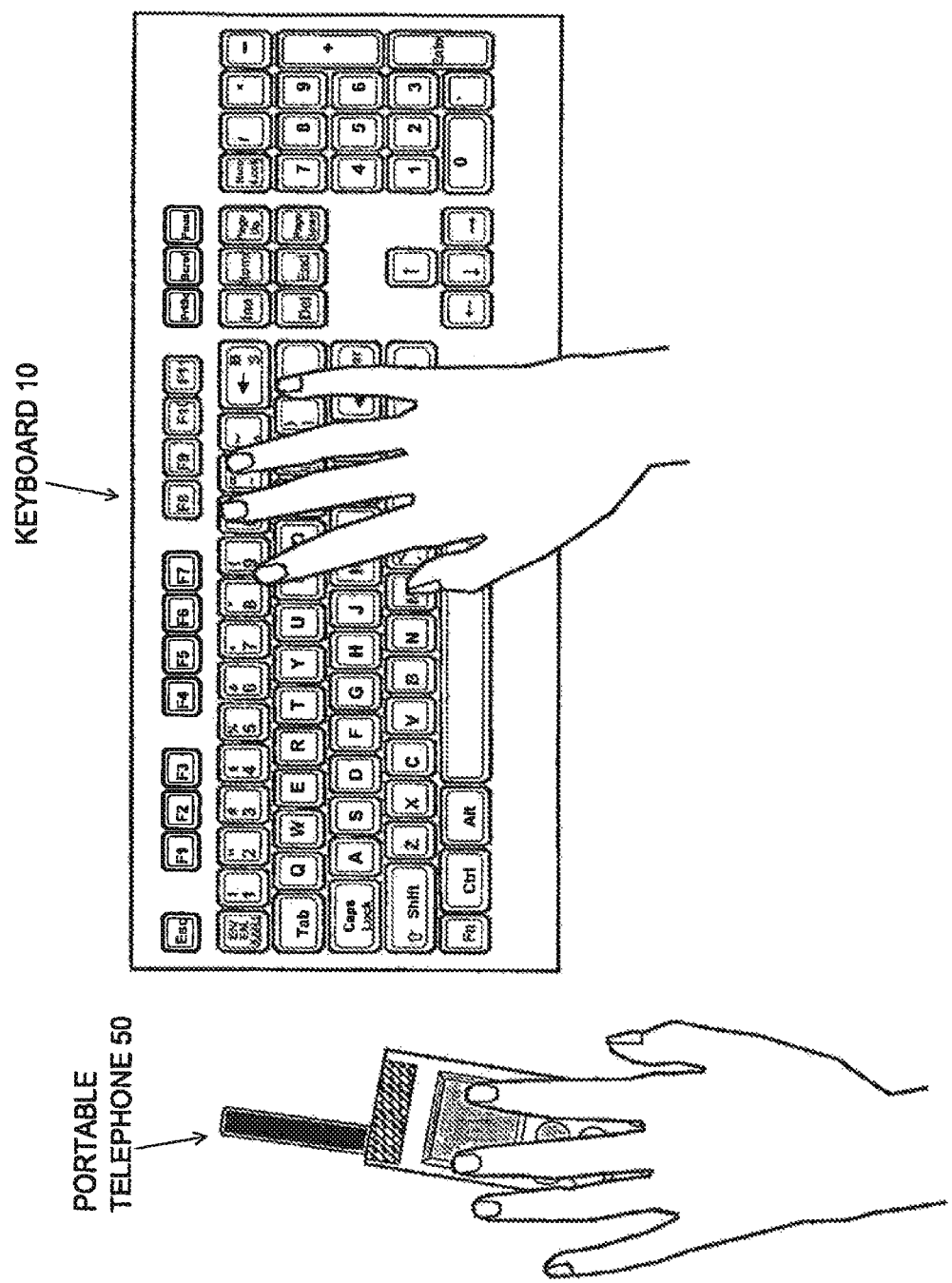
FIG. 11 is a view showing a state in which the user is operating the keyboard 10 by the right hand and handling a portable telephone by the left hand.

FIG. 10 shows in a sketch manner the output levels of the detection signals L, R, and M obtained when the user is operating the keyboard 10 only by the right hand. This state corresponds, for example, to a case (see FIG. 11) in which the user is handling a portable telephone or other external units by the left hand, in addition to a case in which the user gives the left hand a rest. In this state, since a virtual circuit equivalent to a capacitor is formed between the transmission electrode 21 and the right hand of the user, the level of the alternating-voltage signal received by the right-hand-detection receiving electrode 25 is reduced. Therefore, the output levels of the detection signal L and the detection signal M are relatively high, but the output level of the detection signal R is reduced.

Figure 12:
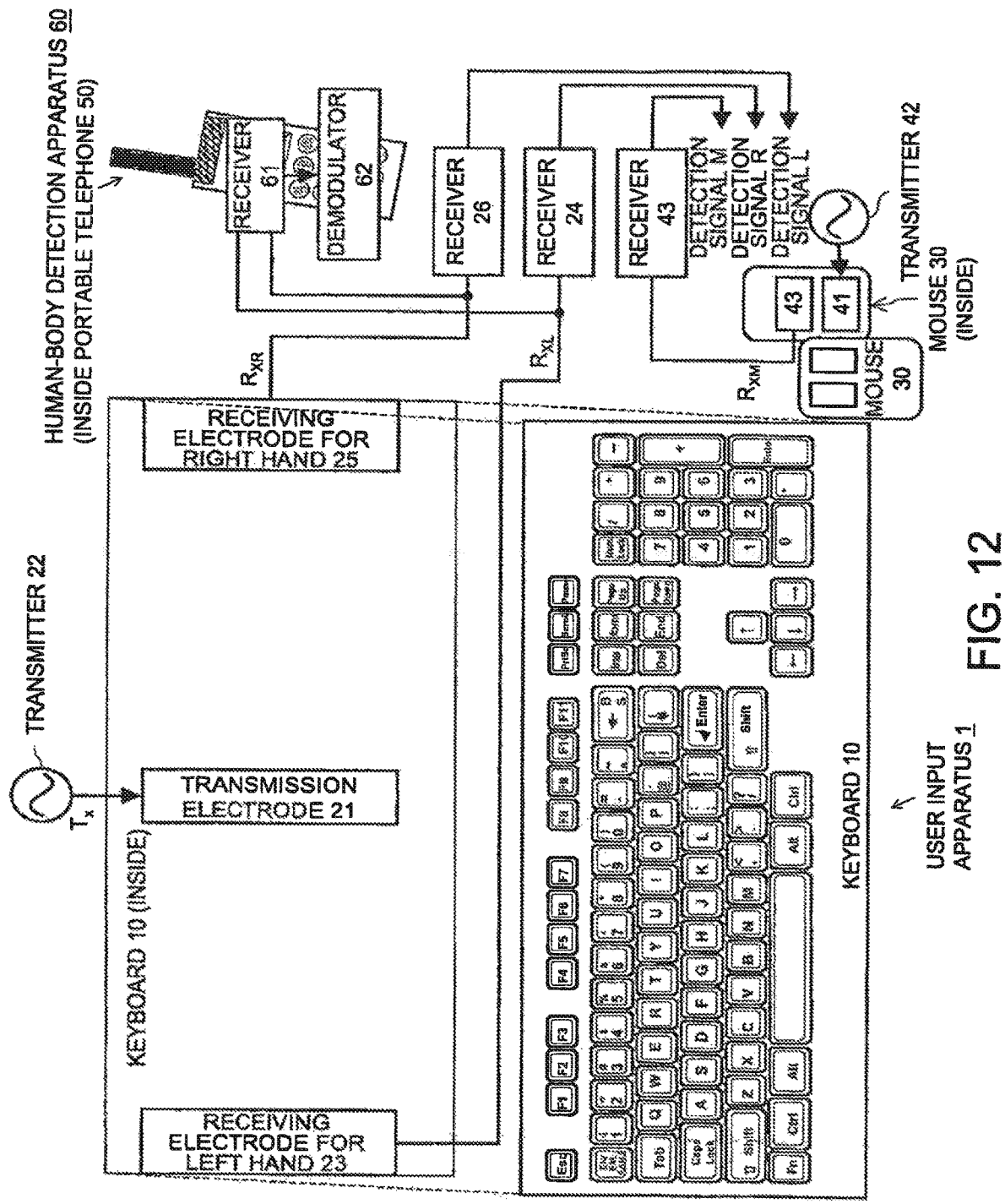
FIG. 12 is a view showing the basic structure of a user input apparatus 1 according to still another embodiment of the present invention in a sketch manner.

FIG. 12 shows in a sketch manner the basic structure of a user input apparatus 1 according to still another embodiment of the present invention. The present invention is the same as the embodiment shown in FIG. 6 in that the user input apparatus 1 is formed of a combination of a keyboard 10 and a mouse 30, but differs from the case shown in FIG. 6 in that it is expected that the user may operate a portable telephone 50 in addition to the user input apparatus 1.

A human-body detection apparatus 20 for recognizing the right hand and the left hand of the user on or above the keyboard 10, which is a general keyboard having, for example, a "QWERTY" arrangement, is incorporated inside the keyboard 10 (below the keyboard input surface). Since the structure and operation characteristics of the human-body detection apparatus 20 are the same as those described above, a description thereof is omitted.

The mouse 30 has therein (not shown) a ball supported so as to rotate freely and a movement sensor for detecting the amounts of movement in the x and y axis directions by the rotation of the ball, and has a general structure in which right and left click buttons are provided at the rear surface. The user puts his or her hand (usually the right hand or the dominant hand) on the rear surface of the mouse 30 to use it. A human-body detection apparatus 40 is built inside the mouse 30. Since the structure and operation characteristics of the human-body detection apparatus 40 are the same as those described above, a description thereof is omitted.

In the present embodiment, the portable telephone 50 is provided with a human-body detection apparatus 60 for determining whether the user operates the portable telephone 50 by a hand. The human-body detection apparatus 60 includes a receiving section 61 formed of an electrically conductive member exposed to the outside on a body wall surface of the portable telephone 50 so as to be able to receive an output signal sent from the transmission electrode 21, and a demodulation section 62 for demodulating a received signal.

When a human body contacts the receiving section 61, formed of the electrically conductive member, it allows signal transfer between transmission means and the receiving means. Therefore, by the signal transfer between the receiving section 61 of the portable telephone 50 and the transmission electrode 21 of the keyboard 10 or the transmission electrode 41 of the mouse 30, a state in which the user puts one hand on the keyboard 10 or the mouse 30, and holds the portable telephone 50 by the other hand can be detected.

Consequently, in the embodiment shown in FIG. 12, a computer to which the user input apparatus 1 is connected can detect the states of use of the user input apparatus 1 such as those shown below.

State 1: Both hands are put on the keyboard 10.

State 2: The left hand is put on the keyboard 10 and the right hand is put on the mouse 30.

State 3: Only one hand (the left hand, for example) is put on the keyboard 10.

State 4: The left hand is used to hold the portable telephone 50, and the right hand is put on the keyboard 10.

As described later, a computer connected to the user input apparatus 1, formed of the mouse 30 and the keyboard 10, can change the system state and an application processing operation according to the use form of the user input apparatus 1 or the portable telephone 50 by automatically detecting a device operated by the user among the keyboard 10, the mouse 30, and the portable telephone 50 (described later).

Figure 13:
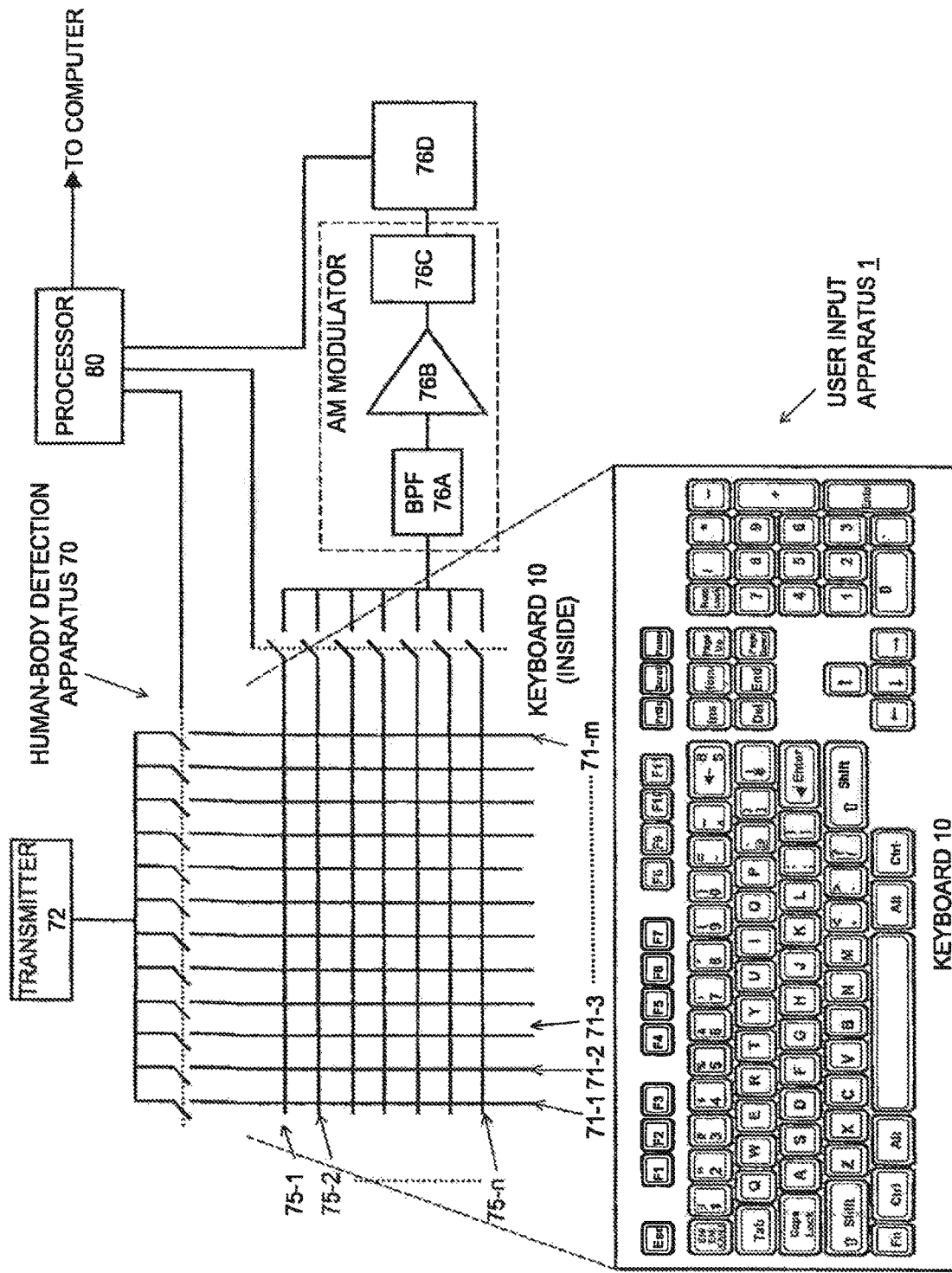
FIG. 13 is a view showing the basic structure of a user input apparatus 1 according to yet another embodiment of the present invention in a sketch manner.

FIG. 13 shows in a sketch manner the basic structure of a user input apparatus 1 according to yet another embodiment of the present invention. The present invention is the same as the embodiment shown in FIG. 1 in that the user input apparatus 1 is formed of a keyboard 10, but differs from the case shown in FIG. 1 in that a keyboard input operation performed by the user can be detected as a multi-dimensional value (in the present embodiment, a two-dimensional value having a two-dimensional or plane extent).

A human-body detection apparatus 70 for recognizing the right hand and the left hand of the user on or above the keyboard 10, which is a general keyboard having, for example, a "QWERTY" arrangement, is incorporated inside the keyboard 10 (below the keyboard input surface).

In the case shown in the figure, the human-body detection apparatus 70 is formed of a plurality of line-shaped transmission electrodes 71-1, 71-2, . . . , and 71-$m$; a transmitter 72 for supplying alternating current for transmission to each of the transmission electrodes 71-1, 71-2, . . . , and 71-$m$; a plurality of line-shaped receiving electrodes 75-1, 75-2, . . . , and 75-$n$ for receiving alternating current from each of the transmission electrodes 71-1, 71-2, . . . , and 71-$m$ by an electrostatic effect; and a receiver 76 for receiving alternating current flowing through each of the receiving electrodes 75-1, 75-2, and 75-$n$. The receiver 76 includes an AM modulator formed of a band-pass filter (BPF) 76A for passing alternating current in a predetermined frequency band only, an amplifier 76B, and a detector 76C, and an A/D converter 76D for converting a detection output to a digital signal.

It is understood that each of the receiving electrodes 75-1, 75-2, . . . , and 75-$n$ has an intersection with each of the transmission electrodes 71-1, 71-2, . . . , and 71-$m$ in FIG. 13. These electrodes do not contact at the intersections. In other words, at each intersection of electrodes, a circuit equivalent to a capacitor, which accumulates charges, is substantially formed. Therefore, when alternating current passes through a transmission electrode, alternating current flows through the intersections to the opposed receiving electrodes by capacitive coupling. An area where the transmission electrodes 71-1, 71-2, . . . , and 71-$m$ and the receiving electrodes 75-1, 75-2, . . . , and 75-$n$ intersect forms an human-body detection area in the human-body detection apparatus 70. This human-body detection area has a two-dimensional extent, as shown in the figure.

The transmitter 72 applies alternating current to each of the transmission electrodes 71-1, 71-2, . . . , and 71-$m$ while scanning. Therefore, at a certain moment, alternating current flows from the circuit equivalent to a capacitor formed at the intersection with the transmission electrode concerned to each of the receiving electrodes 75-1, 75-2, . . . , and 75-$n$. An input position can be detected from the positional relationship between the transmission electrode that transmitted alternating current and the receiving electrode that received alternating current. For example, predetermined calculation processing is applied to the output signals AD-converted of the receiving electrodes 75-1, 75-2, . . . , and 75-$n$ to allow a two-dimensional user input to be detected through the user input area.

In the case shown in the figure, the transmission electrodes 71-1, 71-2, . . . , and 71-$m$ are arranged almost in parallel, and the receiving electrodes 75-1, 75-2, . . . , and 75-$n$ are arranged perpendicularly to the transmission electrodes 71-1, . . . , and the user input area is almost a plane area in which electrodes are combined to form uniform nodes. The scope of the present invention is not limited to such form. If the transmission electrodes 71-1, 71-2, and 71-$m$ intersect with the receiving electrodes 75-1, 75-2, . . . , and 75-$n$ without contacts, they may be arranged to form a shape other than a plane, such as a sphere or other curved surfaces. For example, the human-body detection apparatus 70 having the same structure can be incorporated into the mouse 30.

Figure 14:
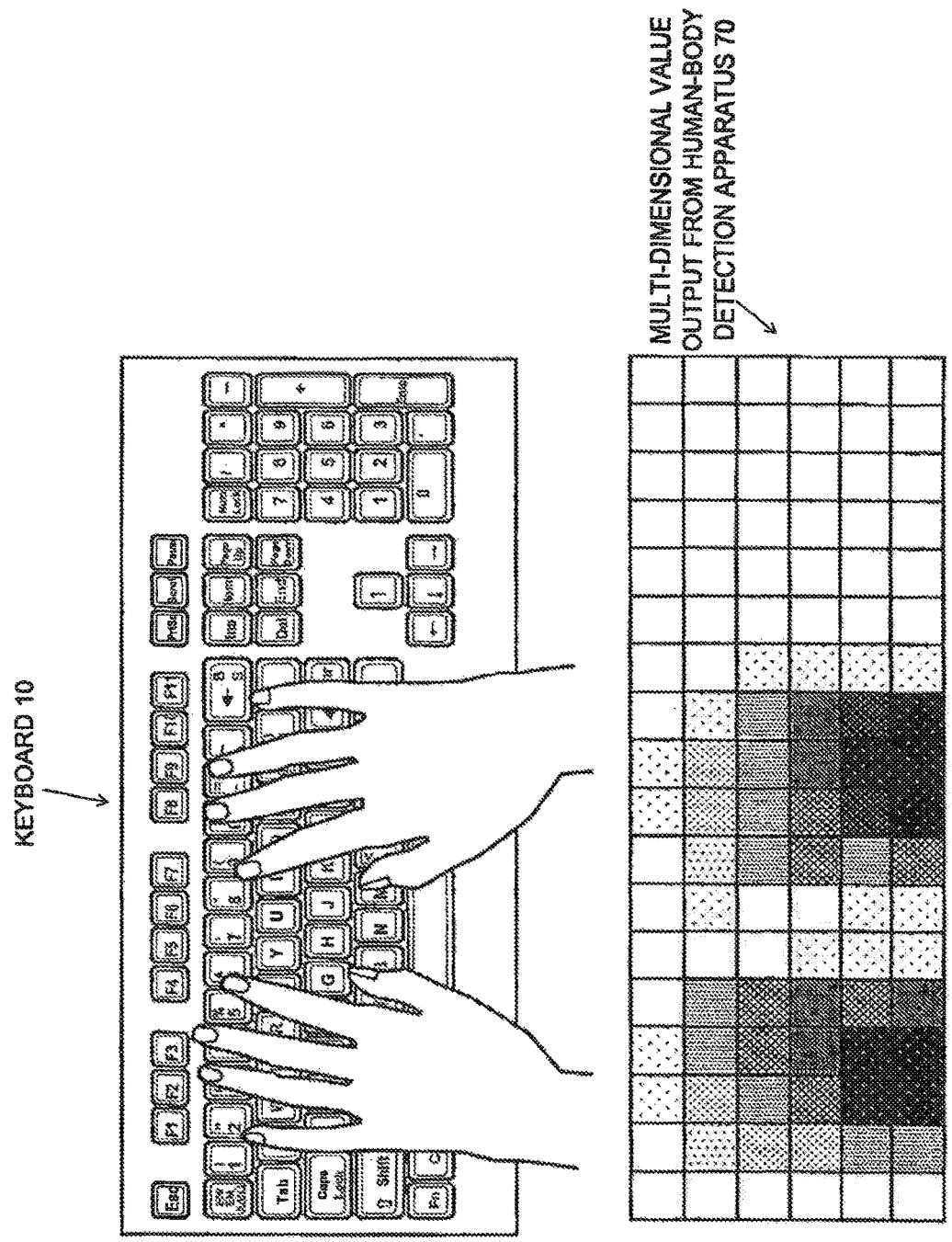
FIG. 14 is a view showing in a sketch manner an output at each intersection of a human-body detection apparatus 70, obtained when the user places both hands on the keyboard 10.
Figure 15:
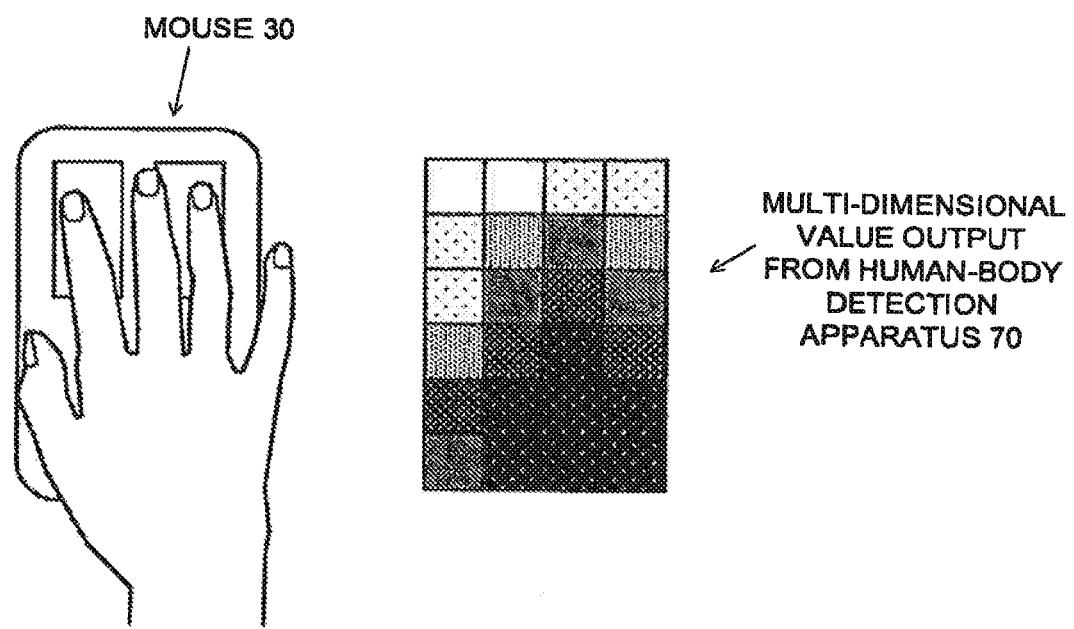
FIG. 15 is a view showing in a sketch manner an output at each intersection of the human-body detection apparatus 70, obtained when the user places both hands on the mouse 30.

The embodiment shown in FIG. 13 has a larger number of electrodes than the case shown in FIG. 1 to allow a finer shape of a hand to be recognized. When the user puts both hands on the keyboard 10, for example, the human-body detection apparatus 70 has a two-dimensional output, as shown in FIG. 14. When the user puts the right hand on the mouse 30, the human-body detection apparatus 70 has a two-dimensional output, as shown in FIG. 15.

The human-body detection apparatus 70 according to the present embodiment can measure how close a hand is disposed at each intersection of a transmission electrode 71 and a receiving electrode 75 independently. An obtained two-dimensional output pattern differs according to how the user places a hand(s) on the input surface of the keyboard 10 or the rear surface of the mouse 30. FIG. 14 and FIG. 15 show outputs levels at intersections by shading.

Since each user has an own nature or habit in key operations, even when the same key input is achieved at the input surface of the keyboard 10, it is expected that a dimensional output obtained through the human-body detection apparatus 70 differs depending on the users. More specifically, when the same person performs the same input operation (such as pressing a predetermined key), it is expected that a multi-dimensional value output from the human-body detection apparatus 70 is almost the same, but the multi-dimensional value differs depending on the users.

Therefore, when the user performs a predetermined input operation at the user input apparatus 1, including the keyboard 10 and the mouse 30, if the multi-dimensional value detected by the human-body detection apparatus 70 is compared and verified, user authentication processing can be executed. Details of user authentication processing which uses a multi-dimensional value obtained by the human-body detection apparatus 70 will be described later.

Figure 16:
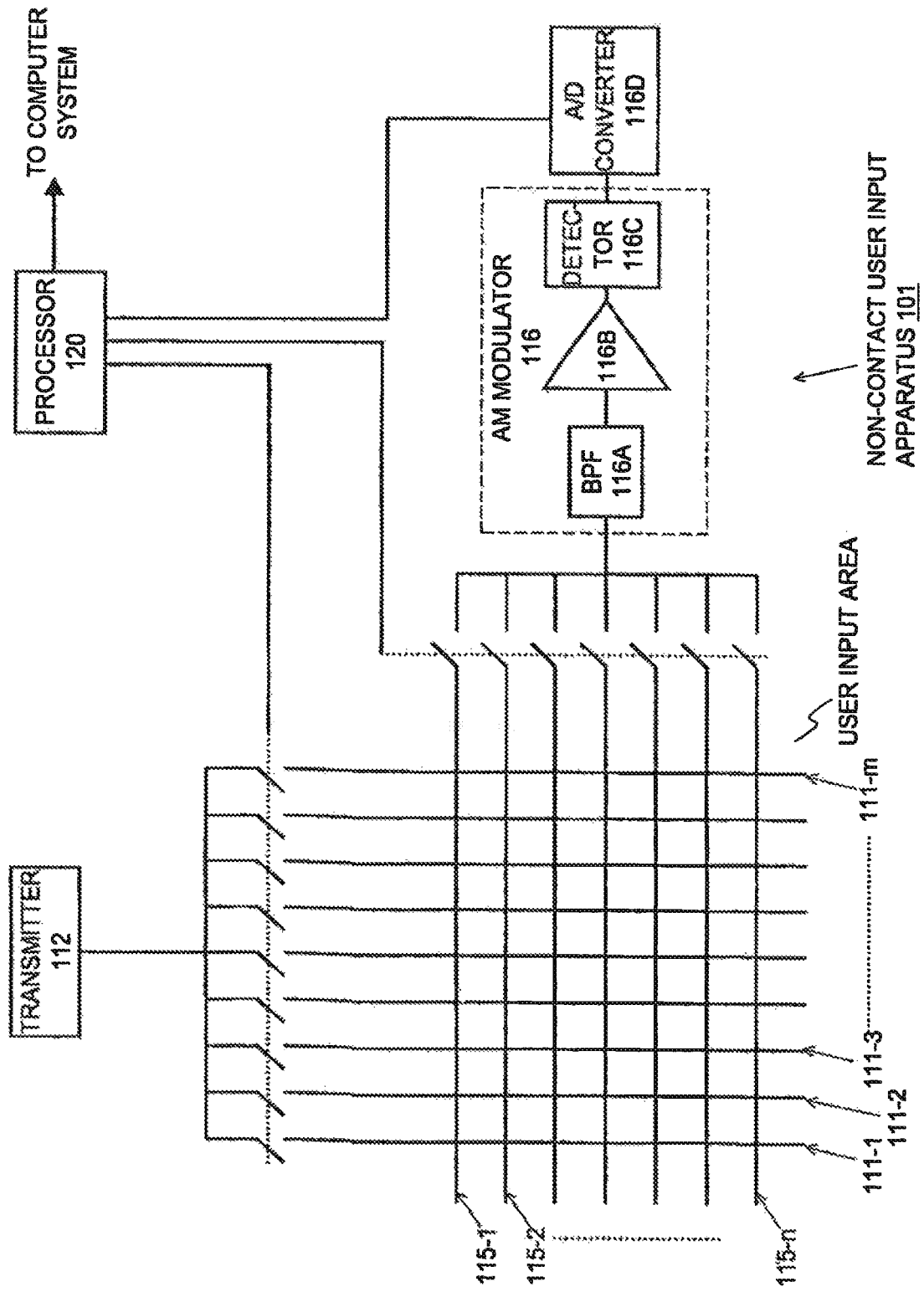
FIG. 16 is a view showing the basic structure of a non-contact user input apparatus 101 according to still another embodiment of the present invention in a sketch manner.

FIG. 16 shows in a sketch manner the basic structure of a user input apparatus 101 according to still yet another embodiment of the present invention. The user input apparatus 101 differs from the above-described embodiments in that it receives user inputs in a non-contact manner.

As shown in the figure, the non-contact user input apparatus 101 is formed of a plurality of line-shaped transmission electrodes 111-1, 111-2, . . . , and 111-*m*; a transmitter 112 for supplying alternating current having a predetermined frequency (100 kHz, for example) for transmission to each of the transmission electrodes 111-1, 111-2, . . . , and 111-*m*; a plurality of line-shaped receiving electrodes 115-1, 115-2, . . . , and 115-*n* for receiving alternating current from each of the transmission electrodes 111-1, 111-2, . . . , and 111-*m* by an electrostatic effect; and a receiver 116 for receiving alternating current flowing through each of the receiving electrodes 115-1, 115-2, and 115-*n*. The receiver 116 includes an AM modulator formed of a band-pass filter (BPF) 116A for passing alternating current in a predetermined frequency band only, an amplifier 116B, and a detector 116C, and an A/D converter 116D for converting a detection output to a digital signal.

It is understood that each of the receiving electrodes 115-1, 115-2, . . . , and 115-*n* has an intersection with each of the transmission electrodes 111-1, 111-2, . . . , and 111-*m* in FIG. 16. These electrodes do not contact at the intersections. In other words, at each intersection of electrodes, a circuit equivalent to a capacitor, which accumulates charges, is substantially formed. Therefore, when alternating current passes through a transmission electrode, alternating current flows through the intersections to the opposed receiving electrodes by capacitive coupling. An area where the transmission electrodes 111-1, 111-2, . . . , and 111-*m* and the receiving electrodes 115-1, 115-2, . . . , and 115-*n* intersect forms an user input area in the non-contact user input apparatus 101. This user input area has a two-dimensional extent, as shown in the figure.

The transmitter 112 applies alternating current to each of the transmission electrodes 111-1, 111-2, . . . , and 111-*m* while scanning. Therefore, at a certain moment, alternating current flows from the circuit equivalent to a capacitor formed at the intersection with the transmission electrode concerned to each of the receiving electrodes 115-1, 115-2, . . . , and 115-*n*. An input position can be detected from the positional relationship between the transmission electrode that transmitted alternating current and the receiving electrode that received alternating current. For example, predetermined calculation processing is applied to the output signals AD-converted of the receiving electrodes 115-1, 115-2, . . . , and 115-*n* to allow a two-dimensional user input to be detected through the user input area.

In the case shown in the figure, the transmission electrodes 111-1, 111-2, . . . , and 111-*m* are arranged almost in parallel, and the receiving electrodes 115-1, 115-2, and 115-*n* are arranged perpendicularly to the transmission electrodes 111-1, 111-2, . . . , and 111-*m*, and the user input area is almost a plane area in which electrodes are combined to form uniform nodes. The scope of the present invention is not limited to such form. If the transmission electrodes intersect with the receiving electrodes without contacts, they may be arranged to form a shape other than a plane, such as a sphere or other curved surfaces.

Figure 17:
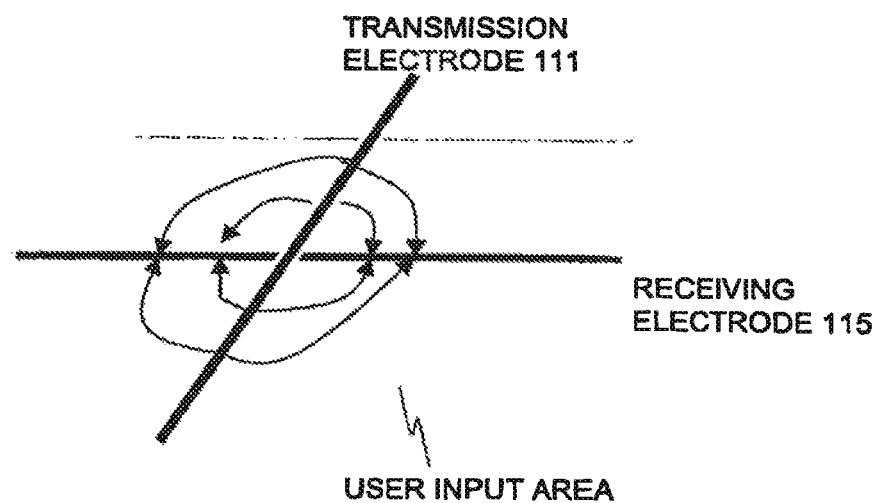
FIG. 17 is an enlarged view showing one intersection of a transmission electrode 111 and a receiving electrode 115.
Figure 18:
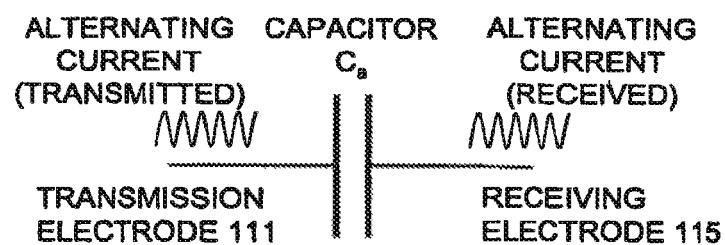
FIG. 18 is a view showing an equivalent circuit of the intersection of the transmission electrode 111 and the receiving electrode 115.

FIG. 17 shows one intersection of a transmission electrode 111 and a receiving electrode 115 in an expanded manner. FIG. 18 shows an equivalent circuit formed at the intersection of the transmission electrode 111 and the receiving electrode 115.

The circuit equivalent to a capacitor is formed at the intersection of the transmission electrode 111 and the receiving electrode 115, as shown in FIG. 18.

When an alternating voltage is applied to the transmission electrode 111, a capacitor $C_a$ generates capacitive coupling between the transmission electrode 111 and the receiving electrode 115, and alternating current is generated at the receiving electrode 115. The intensity of the current passing through the capacitor $C_a$ is taken out as digital data by applying signal processing at the band-pass filter 116A which has tuned in to the oscillation frequency of the alternating voltage generated at the transmitter 112, the amplifier 116B, the detector 116C, and the A/D converter 116D. The intensity of the alternating current received by the receiving electrode 115 only depends on the capacitance $C_a$ of the capacitor.

The capacitance $C_a$ is static and fixed unless the transmission electrode 111 or the receiving electrode 115 is deformed. Therefore, as long as the same alternating voltage is applied to the transmission electrode 111, the intensity of the alternating current received by the receiving electrode 115 is constant.

A mechanism for detecting an object such as the tip of a finger of the user in a non-contact manner by using a combination of the transmission electrode 111 and the receiving electrode 115 will be described next.

Figure 19:
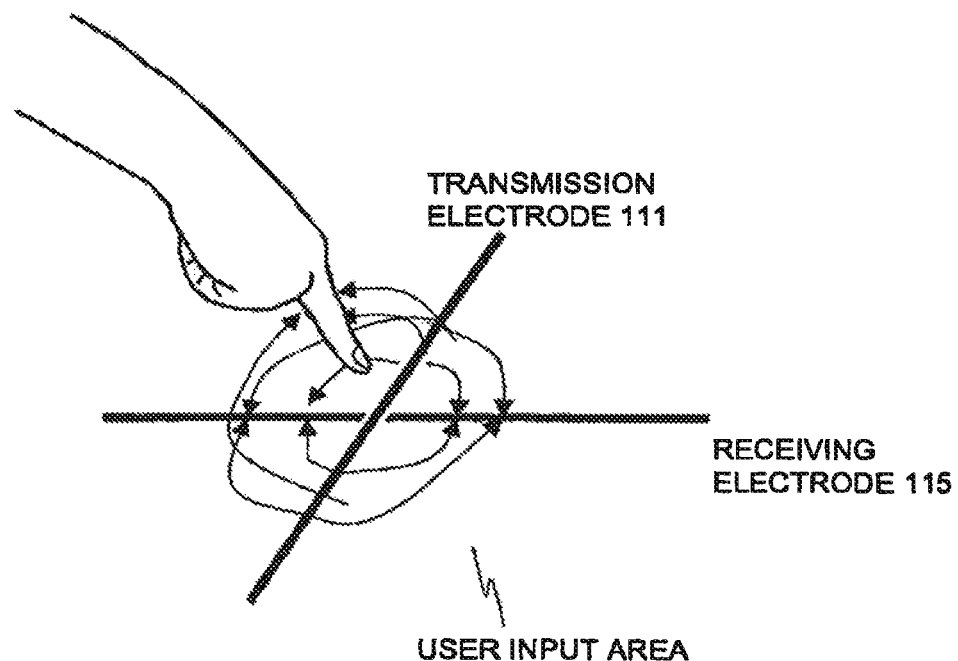
FIG. 19 is a view showing a state in which a user's finger tip is approaching the intersection of the transmission electrode 111 and the receiving electrode 115.
Figure 20:
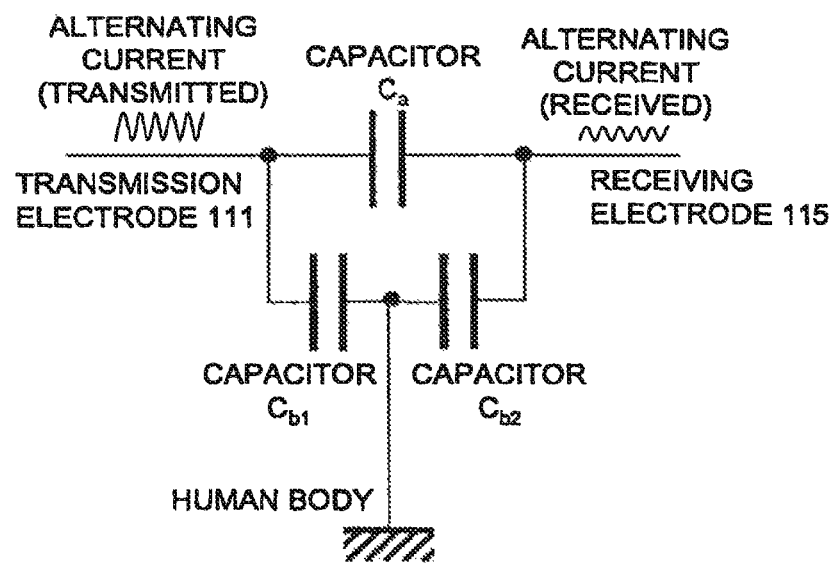
FIG. 20 is a view showing an equivalent circuit of the intersection of the transmission electrode 111 and the receiving electrode 115, generated when a user's finger tip approaches the intersection of the transmission electrode 111 and the receiving electrode 115.

FIG. 19 shows in a situation in which the tip of a finger of the user approaches one intersection of the transmission electrode 111 and the receiving electrode 115. FIG. 20 shows an equivalent circuit generated at one intersection of the transmission electrode 111 and the receiving electrode 115, obtained when the tip of a finger of the user approaches the intersection of the transmission electrode 111 and the receiving electrode 115.

As described above, the circuit equivalent to the capacitor $C_a$ is formed at the intersection of the transmission electrode 111 and the receiving electrode 115.

A human body, such as a finger tip, can be regarded as a virtual grounding point (ground). Therefore, the equivalent circuit has a structure in which the capacitor $C_a$ formed between the transmission electrode 111 and the receiving electrode 115 is connected in parallel to virtual capacitors $C_{b1}$ and $C_{b1}$ formed in series, between the human body and the transmission electrode 111 and between the human body and the receiving electrode 115, respectively.

Therefore, when an alternating voltage is applied to the transmission electrode 111, alternating current generated by capacitive coupling caused by the capacitance $C_a$ between the transmission electrode 111 and the receiving electrode 115, that is, the intensity of current detected by the receiving electrode 115, is weakened by the amount of current flowing into the ground through the capacitor $C_{b1}$.

The capacitance $C_a$ is static and fixed unless the transmission electrode 111 or the receiving electrode 115 is deformed. In contrast, the capacitance $C_{b1}$ and the capacitance $C_{b2}$ of the virtual capacitors formed in series, between the human body and the transmission electrode 111 and between the human body and the receiving electrode 115, respectively, are increased as a human body approaches the transmission electrode 111 and the receiving electrode 115.

Therefore, when the same alternating voltage is applied to the transmission electrode 111, the intensity of the alternating current detected by the receiving electrode 115 becomes smaller as a human body approaches the transmission electrode 111 and the receiving electrode 115.

By using this phenomenon, with the use of a received signal which has been AM-modulated by the AM modulator 116, and further converted to a digital form by the A/D converter 116D, a processor 120 can determine whether a human body is disposed close to an intersection of electrodes, or can determine how close a human body is disposed (measure the distance to the human body).

In the non-contact user input apparatus 101 shown in FIG. 16, m by n intersections are arranged in a matrix manner by the transmission electrodes 111-1, 111-2, . . . , and 111-m and the receiving electrodes 115-1, 115-2, . . . , and 115-n. For example, the intersections of the electrodes can be placed on an input panel having a certain plane (or curved surface).

When an alternating voltage is applied in a time-division manner to the transmission electrodes 111-1, 111-2, . . . , and 111-m, and in response to the application, alternating current generated at the receiving electrodes 115-1, 115-2, . . . , and 115-n is sequentially measured, which intersection in the user input area a human body is approaching can be determined.

Since the non-contact user input apparatus 101 according to the present embodiment uses an electrostatic effect, a human body such as a finger tip of the user does not need to directly contact an electrode to be detected. By integrating detection values obtained at nearby intersections and applying a general geographical calculation, the distance from the finger tip to the input surface can be obtained.

According to the structure shown in FIG. 16, each intersection of electrodes can be independently driven. In other words, since a detection value can be taken out independently from each intersection, when a plurality of objects (the right hand and left hand of the same user, or a plurality of user hands, for example) is approaching the user input area at the same time, if the distances between them are longer than the pitch of the intersections, the objects can be recognized independently. Namely, the positions of a plurality of objects can be measured at the same time.

By tracking intersections where an approaching object was detected at the same time, the shape or the outline of the approaching object can be obtained.

Figure 21:
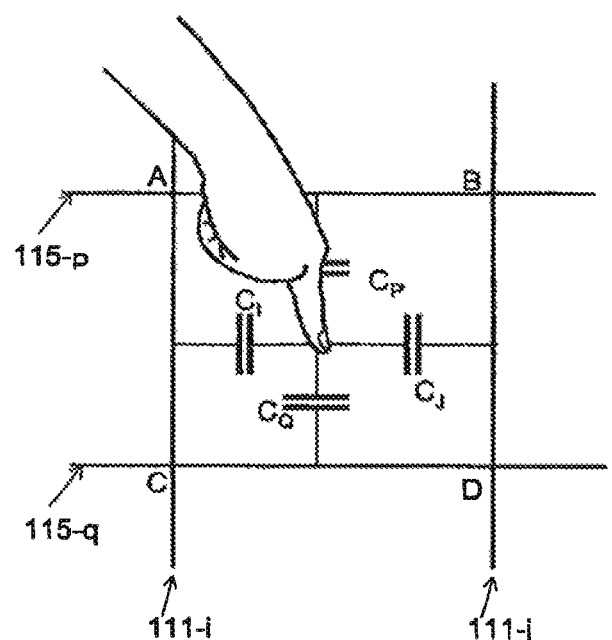
FIG. 21 is a view for describing a modification of the non-contact user input apparatus 101.

FIG. 21 shows a modification of the non-contact user input apparatus 101 shown in FIG. 16.

When a finger tip of the user approaches an area enclosed by grid points A, B, C, and D, virtual capacitors $C_I$, $C_J$, $C_P$, and $C_Q$ are formed between the finger tip of the user and transmission electrodes 111-i and 111-j and receiving electrodes 115-p and 115-q.

The capacitances $C_I$, $C_J$, $C_P$, and $C_Q$ of the virtual capacitors are changed according to the distance between the finger tip of the user and the electrodes.

Therefore, by integrating values caused by the human body and the electrodes and obtained from a plurality of the intersections, the position of the hand disposed in the area enclosed by the intersections can be measured. More specifically, the precision of positional measurement performed by the non-contact user input apparatus 101 according to the present embodiment can be made finer than the distance between the intersections of the electrodes.

Figure 22:
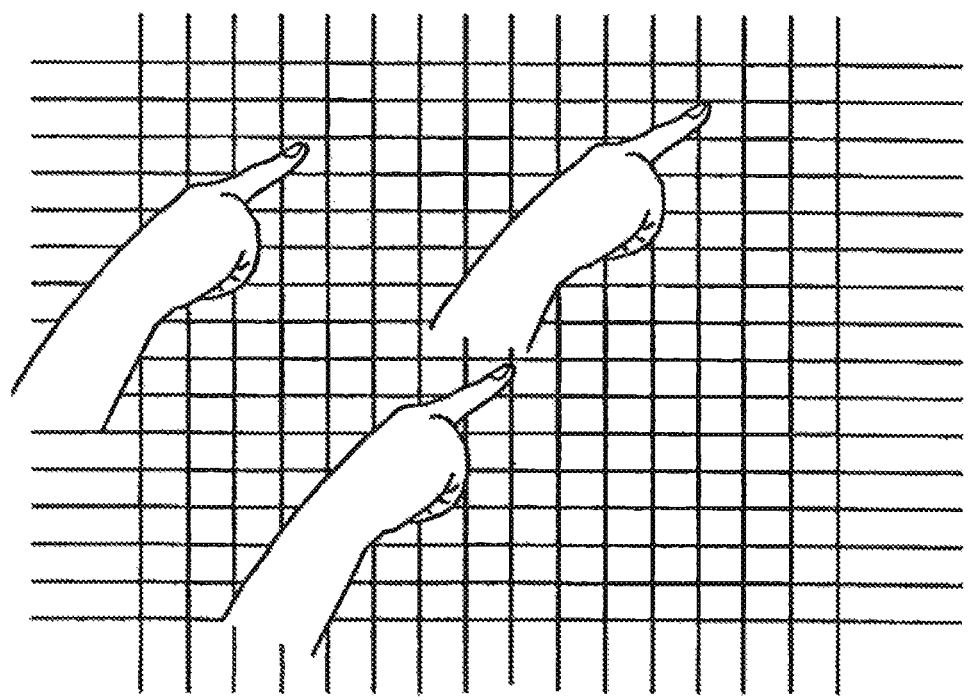
FIG. 22 is a view for describing a modification of the non-contact user input apparatus 101.

FIG. 22 shows another modification of the non-contact user input apparatus 101 shown in FIG. 16.

As described by referring to FIG. 16, a non-contact user input apparatus 101 according to the present embodiment has m by n intersections arranged in a matrix manner by transmission electrodes 111-1, 111-2, . . . , and 111-m and receiving electrodes 115-1, 115-2, . . . , and 115-n in its user input area. According to the structure shown in FIG. 16, each intersection of the electrodes can be independently driven to obtain a detection value independently from each intersection.

Therefore, as shown in FIG. 22, when a plurality of user finger tips are disposed in the user input area, they can be independently recognized at the intersections close to the user finger tips. As a result, with the use of a single user input apparatus, simultaneous inputs can be received from a plurality of users.

Figure 23:
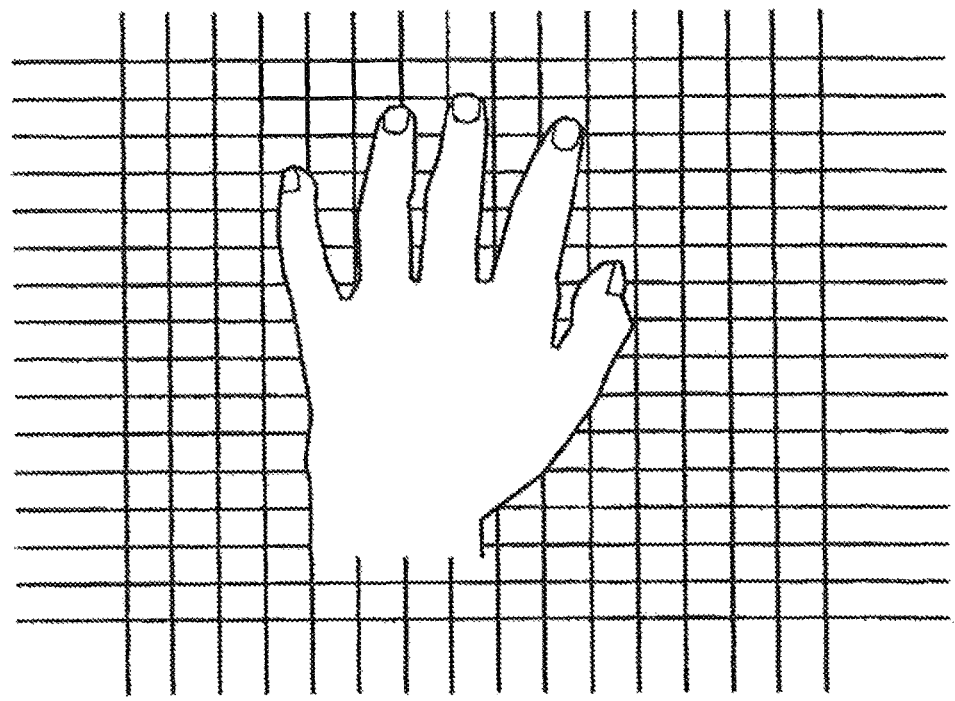
FIG. 23 is a view for describing a modification of the non-contact user input apparatus 101.

FIG. 23 shows another modification of the non-contact user input apparatus 101 shown in FIG. 16.

As described by referring to FIG. 16, a non-contact user input apparatus 101 according to the present embodiment has m by n intersections arranged in a matrix manner by transmission electrodes 111-1, 111-2, . . . , and 111-m and receiving electrodes 115-1, 115-2, . . . , and 115-n in its user input area. In the case shown in FIG. 23, however, the pitch of the transmission electrodes 111-1, 111-2, . . . , and 111-m and the pitch of the receiving electrodes 115-1-1, 115-2, . . . , and 115-n are set sufficiently small, and the speed of scanning of a transmitter 112 used for applying an alternating voltage to each transmission electrode 111-1 is sufficiently high.

In such a case, as shown in FIG. 23, when a palm of the user approaches the user input area, the shape of the object, that is, the palm, can be recognized by tracking the intersections where the approaching palm was detected.

In other words, by setting the pitch of the electrodes sufficiently small and setting the scanning speed at the transmission electrodes sufficiently high, the non-contact user input apparatus 101 according to the present embodiment can recognize the shape of an object.

It is also expected that the non-contact user input apparatus 101 according to the present embodiment is combined with another device and applied. For example, when the non-contact user input apparatus 1 is superposed on a flat display such as a liquid-crystal display (LCD) or an organic EL, a user input apparatus with an integrated display is provided. According to such a user input apparatus, the user can input commands to a computer intuitively and easily while guided by the contents of a GUI screen displayed. The user can perform an input operation without distracting his or her eyes from the display screen, reducing the possibility of erroneous operations.

Figure 24:
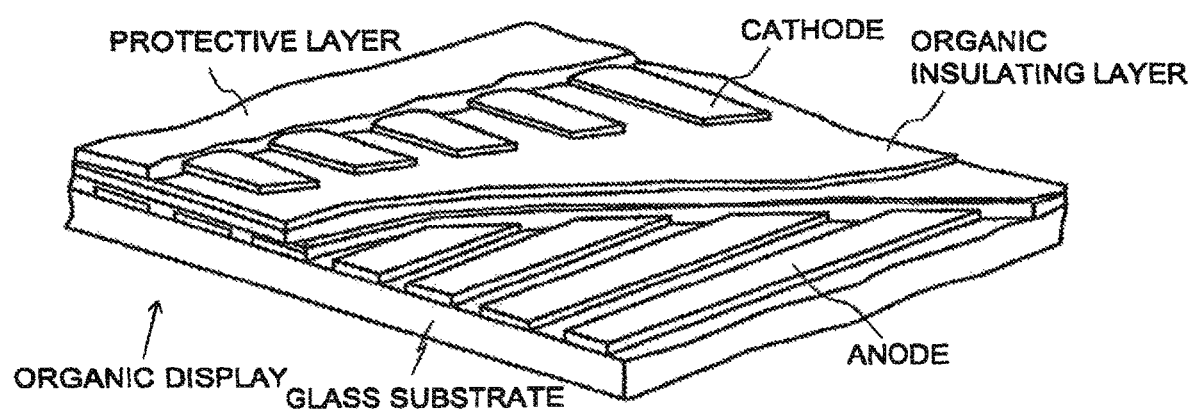
FIG. 24 is a view showing a cross-sectional structure of a non-contact user input apparatus 101 structured integratedly with a display apparatus formed of a light emitting devices made from electrically conductive polymer, that is, organic LEDs.

FIG. 24 shows in a sketch manner a cross-sectional structure of a non-contact user input apparatus 1 structured integratedly with a display apparatus formed of light emitting devices made from electrically conductive polymer, that is, organic LEDs.

In the case shown in the figure, an anode electrode layer and a cathode electrode layer made from electrically conductive polymer are laminated with an insulating layer made from an organic material placed therebetween. The anode electrode and the cathode electrode are arranged perpendicular to each other. This structure is similar to that shown in FIG. 16, in which the transmission electrodes 111-1, 111-2, . . . , and 111-$m$ and the receiving electrodes 115-1, 115-2, . . . , and 115-$n$ are intersected without contacting each other.

In organic displays, to emit light from pixels, a direct voltage is sequentially applied to each electrode toward a screen scanning direction in one electrode layer.

In the present embodiment, an alternating voltage for detecting a human body is superposed on a direct voltage applied in one electrode layer, and applied. As a result, the other electrode layer receives alternating current. Since the intensity of received alternating current is reduced at intersections to which a human body such as a finger tip of the user is approaching, the position of the finger tip of the user can be determined, and further, the shape of the approaching object can be recognized.

According to the structure shown in FIG. 24, the display apparatus can be used as is as a non-contact user input apparatus without changing the screen structure of the organic display.

Organic displays are generally flexible, and can be fold in any manner. Therefore, according to the application example shown in FIG. 24, a spherical or cylindrical display apparatus with a user input apparatus integrated can be structured.

B. Applications in Computer Connected to User Input Apparatus

As already described, a computer connected to the user input apparatus 1 according to the present invention can change the system state and an application processing operation in response to the result of recognition of whether the right hand and the left hand are disposed on the keyboard 10. Applications in the computer connected to the user input apparatus will be described below.

Figure 25:
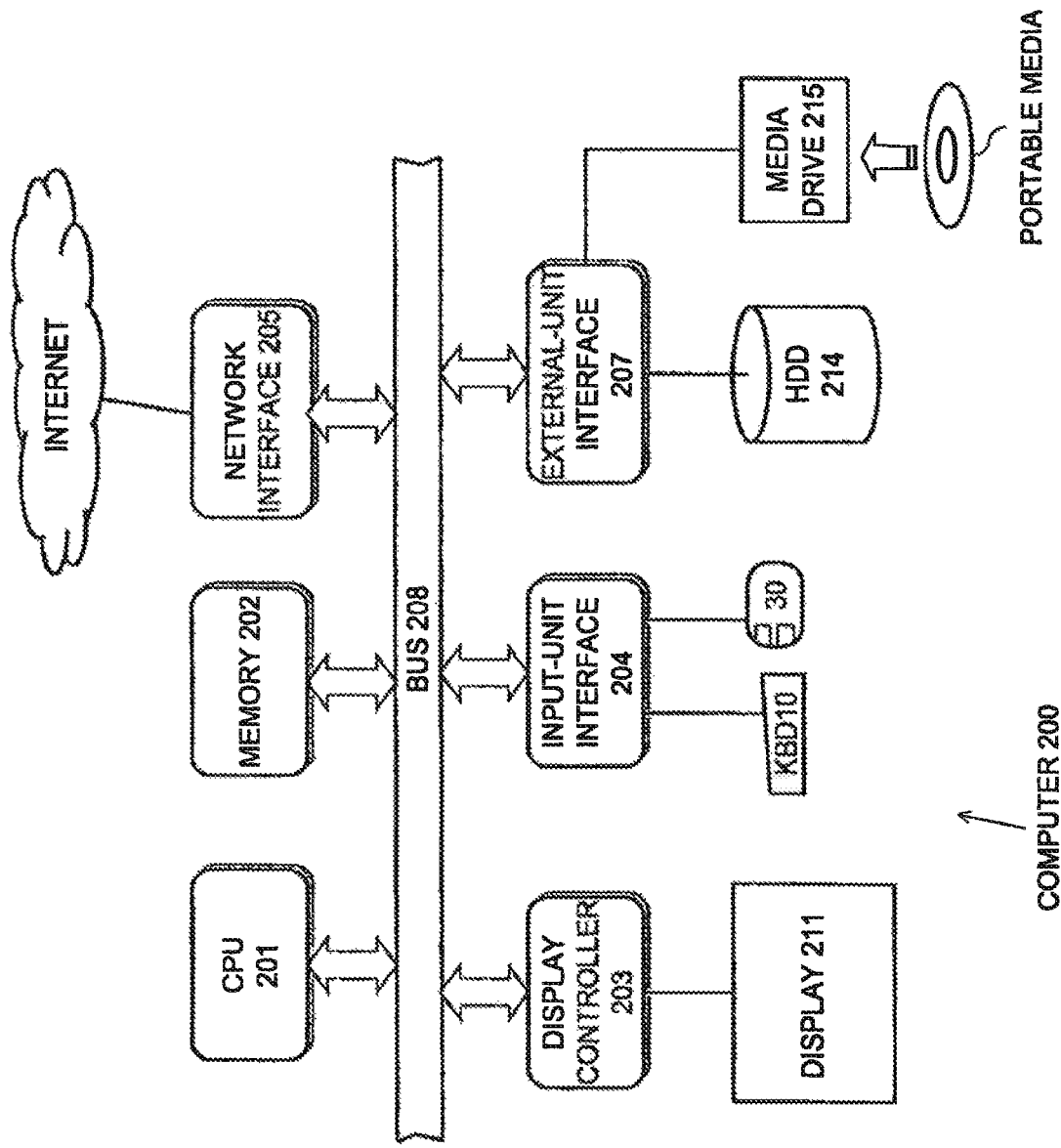
FIG. 25 is a view showing in a sketch manner the hardware structure of a computer 200 to which the present invention can be applied.

FIG. 25 shows in a sketch manner the hardware structure of a computer 200 to which the present invention can be applied. By referring to the figure, each component of the computer 200 will be described below.

A CPU (central processing unit) 201, serving as a main controller of the system 200, executes various applications under the control of the operating system (OS). The CPU 201 can execute a procedure (described later) for changing the system state and an application processing operation in response, for example, to the result of recognition of a human body. As shown in the figure, the CPU 201 is mutually connected to other units (described later) by a bus 208.

A memory 202 is a storage apparatus that stores program code to be executed by the CPU 201 and is used to temporarily hold work data being executed. It is assumed that the memory 202 shown in the figure can be either a non-volatile memory or a volatile memory.

A display controller 203 is a special controller for actually processing drawing instructions issued by the CPU 201. Drawing data processed by the display controller 203 is written, for example, into a frame buffer (not shown), and then displayed on a display 211.

An input-unit interface 204 is an apparatus for connecting the user input apparatus 1, including the keyboard 10 and the mouse 30, described before, to the computer 200. The input-unit interface 204 according to the present embodiment can receive detection signals $R_{XL}$, $R_{XR}$, and $R_{XM}$ sent through a human-body detection apparatus, in addition to a scanning code input sent from the keyboard 10 and a coordinate designation input sent from the mouse 30.

A network interface 205 can connect the system 200 to limited-area networks such as LANs (local area networks) and further to wide area networks such as the Internet according to a predetermined communication protocol such as the Ethernet.

On a network, a plurality of host terminals (not shown) is connected in a transparent state to form a distributed computing environment. Software programs and data contents can be distributed through the network. For example, software that describes in a computer readable format a procedure for changing the system state and an application processing operation according to the result of recognition of a human body can be downloaded through the network. Multi-dimensional values for user authentication processing, obtained from the human-body detection apparatus 70 may be transferred between systems through a network.

An external-unit interface 207 is an apparatus for connecting external apparatus such as a hard disk drive (HDD) 214 and a media drive 215 to the system 200.

The HDD 214 is an external storage apparatus (known) in which a magnetic disk serving as a storage medium is mounted fixedly, and is superior to other external storage apparatuses in terms of the storage capacity and the data transfer rate. Placing a software program in the HDD 214 in an executable state is called the "installation" of the program into the system. Usually, the HDD 214 stores the program code of the operating system to be executed by the CPU 201, application programs, device drivers, and others in a non-volatile manner.

For example, software which describes in a computer readable format a procedure for changing the system state and an application processing operation according to the result of recognition of a human body can be installed into the HDD 214. Multi-dimensional values for user authentication processing, obtained from the human-body detection apparatus 70 may be stored in the HDD 214 in a non-volatile manner.

The media drive 215 is an apparatus in which portable media such as CDs (compact discs), MOs (magneto-optical discs), and DVDs (digital versatile discs) are loaded and which accesses the data recording surfaces thereof.

Portable media are mainly used for backing up data such as software programs and data files in a computer readable format and for transferring (that is, including sales, circulation, and distribution) them between systems. For example, software that describes in a computer readable format a procedure for changing the system state and an application processing operation according to the result of recognition of a human body can be circulated and distributed physically among a plurality of units by using the portable media. Multi-dimensional values for user authentication processing, obtained from the human-body detection apparatus 70 may be transferred among systems through the portable media.

Examples of the computer 200 shown in FIG. 25 include the compatibles or subsequent models of the personal computer PC/AT (Personal Computer/Advanced Technology) manufactured by the International Business Machines Corporation. It is also possible that the present invention is applied to computers having other architectures as the computer 200 according to the present embodiment.

In the computer 100 described above, the following states of use of the user can be identified according to the human-body detection signals $R_{XL}$, $R_{XR}$, and $R_{XM}$ obtained from the user input apparatus 1.

State 1: Both hands are put on the keyboard 10.

State 2: The left hand is put on the keyboard 10 and the right hand is put on the mouse 30.

State 3: Only one hand (the left hand, for example) is put on the keyboard 10.

State 4: The left hand is used to hold the portable telephone 50, and the right hand is put on the keyboard 10.

In the computer 200 connected to the user input apparatus 1 according to the present invention, for example, while an editing tool such as a drawing editor is activated, the operation can be changed according to the identification of the state 1 or the state 2. For example, while the state 1 is being detected, the keyboard 10 operates as text input mode. In response to the detection of the state 2, the mode is automatically changed to command key mode in which command keys (such as drawing generation and line-type identification) for supporting mouse operations are assigned to the left-hand part of the keyboard 10. The user does not need to input a special command to change the mode.

Figure 26:
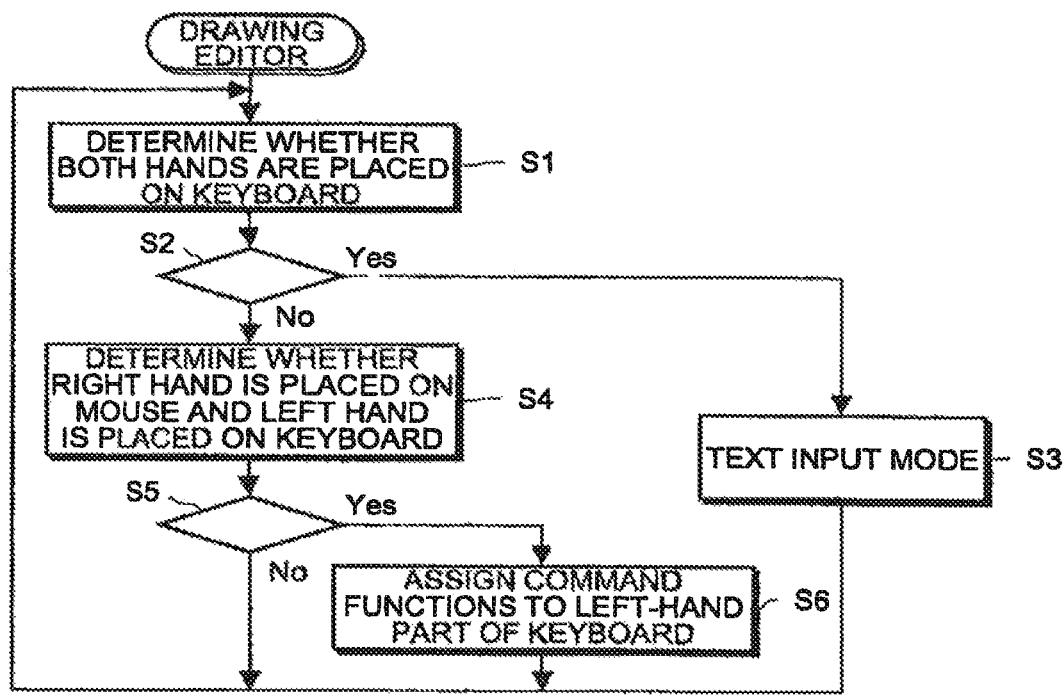
FIG. 26 is a flowchart showing a processing procedure in which the computer 200 changes an operation according to the detection of state 1 or state 2.

In FIG. 26, a processing procedure for changing the operation of the computer 200 in response to the identification of the state 1 or the state 2 while an editing tool such as a drawing editor is activated is shown in a flowchart form. This processing procedure is implemented, for example, in a form in which the CPU 201 executes predetermined program code. The processing procedure for changing the operation of the computer 200 will be described below by referring to the flowchart.

In step S1, it is determined whether both hands of the user are placed on the keyboard 10 while an editing tool such as a drawing editor is activated in the computer 200.

When the state 1, in which both hands of the user are placed on the keyboard 10, is identified, the procedure proceeds to step S3 from the branch "Yes" of a determination block S2, and the entire keyboard 10 is operated in text input mode according to a usual key assignment.

When the state 1 is not identified, the procedure proceeds to step S4 from the branch "No" of the determination block S2, and it is further determined whether the right hand of the user is placed on the mouse 30.

When the state 2, in which the right hand of the user is placed on the mouse and only the left hand is placed on the keyboard 10, is identified, the procedure proceeds to step S6 from the branch "Yes" of a determination block S5, and the mode is changed to command key mode, in which command keys for supporting mouse operations are assigned to the left-hand part of the keyboard 10.

The computer 200 can perform netsurfing in a WWW (world wide web) space structured on the Internet, by using a web browser (known). In the computer 100 connected to the user input apparatus 1 according to the present invention, command keys for web navigation can be automatically assigned to the right-hand part of the keyboard in response, for example, to the detection of the state 3 while the web browser is activated. A memo tool for a portable telephone can be automatically activated and the text input mode of the tool is automatically set to a one-hand keyboard[*/] in response to the detection of the state 4, in which the left hand is used to operate an information communication terminal such as the portable telephone 50. The user does not need to give an explicit command to the computer 100 to change the mode. The system can detect the form of use of the user to appropriately change the processing.

Figure 27:
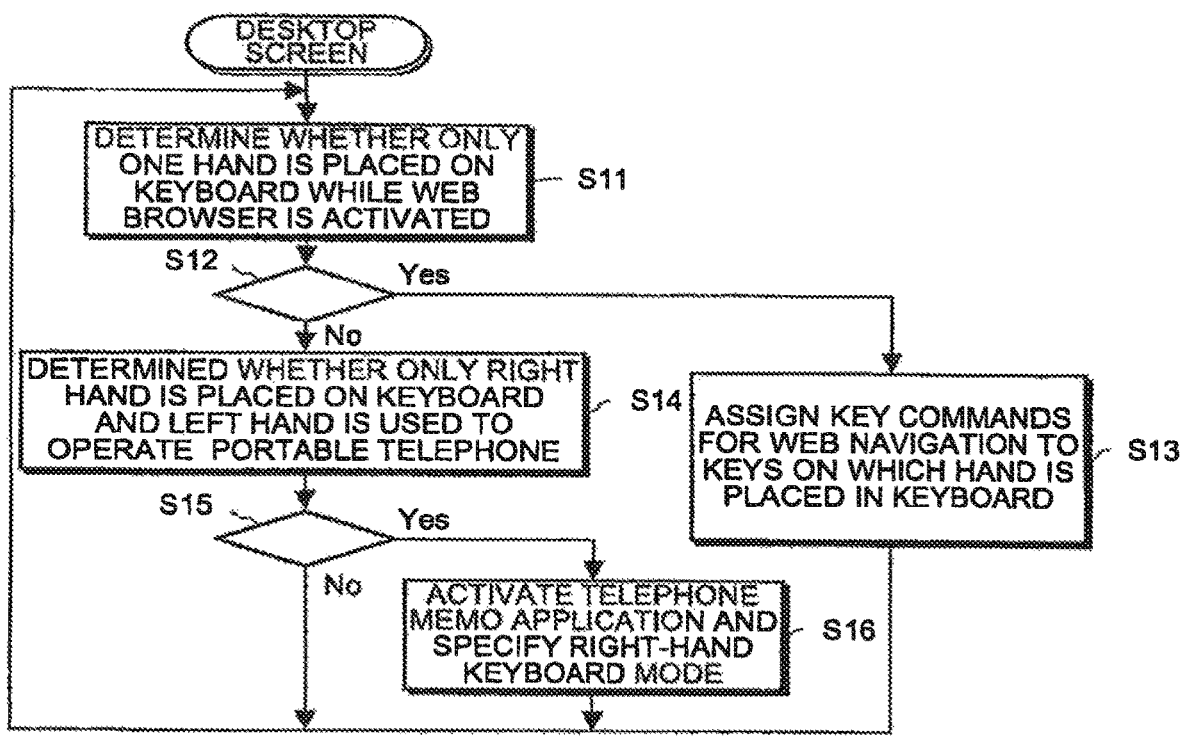
FIG. 27 is a flowchart showing a processing procedure in which the computer 200 changes an operation according to the detection of state 3 or state 4.

In FIG. 27, a processing procedure for changing the operation of the computer 200 in response to the identification of the state 3 or the state 4 while a web browser is activated is shown in a flowchart form. This processing procedure is implemented, for example, in a form in which the CPU 201 executes predetermined program code. The processing procedure for changing the operation of the computer 200 will be described below by referring to the flowchart.

In step S11, it is determined whether only one hand of the user is placed on the keyboard 10 while a navigation tool such as a web browser is activated in the computer 200.

When the state 3, in which only one hand of the user is placed on the keyboard 10, is identified, the procedure proceeds to step S13 from the branch "Yes" of a determination block S12, and key commands for web navigation are assigned to keys at an area where the user's hand is placed on the keyboard 10.

When the state 3 is not identified, the procedure proceeds to step S14 from the branch "No" of the determination block S12, and it is further determined whether only the right hand of the user is placed on the keyboard 10 and the left hand is used to operate the portable telephone 50.

When the state 4, in which only the right hand of the user is used to operate the keyboard 10 and the left hand is used to operate the portable telephone 50, is identified, the procedure proceeds to step S16 from the branch "Yes" of a determination block S15, and a telephone memo application is activated and a right-hand keyboard mode in which a right-hand operation area of the keyboard 10 can be operated by one hand is automatically specified.

When the user applies a predetermined input operation to the user input apparatus 1, including the keyboard 10 and the mouse 30, the computer 200 connected to the user input apparatus 1 according to the present invention can execute user authentication processing by comparing and verifying multi-dimensional values (see FIG. 14 and FIG. 15) detected by the human-body detection apparatus 70 (described before).

Authentication processing based on user inputs is divided into user registration processing serving as a preprocess for authentication, and authentication processing based on registered data.

Figure 28:
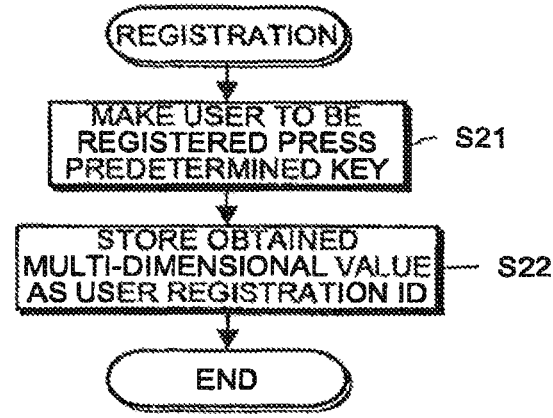
FIG. 28 is a flowchart showing the procedure of user authentication processing based on multi-dimensional values sent from the human-body detection apparatus 70, obtained when the user performs an input operation to the user input apparatus 1.

In FIG. 28, the procedure of the user registration processing for registering multi-dimensional values from the human-body detection apparatus 70 is shown in a flowchart form. This processing procedure is implemented, for example, in a form in which the CPU 201 executes predetermined program code. The processing procedure for user registration will be described below by referring to the flowchart.

The user to be registered is made to press a predetermined key on the keyboard 10 (in step S21).

When the predetermined key is pressed, a multi-dimensional value obtained by the human-body detection apparatus 70 is stored as the identification information (ID) of the user to be registered (in step S22).

Figure 29:
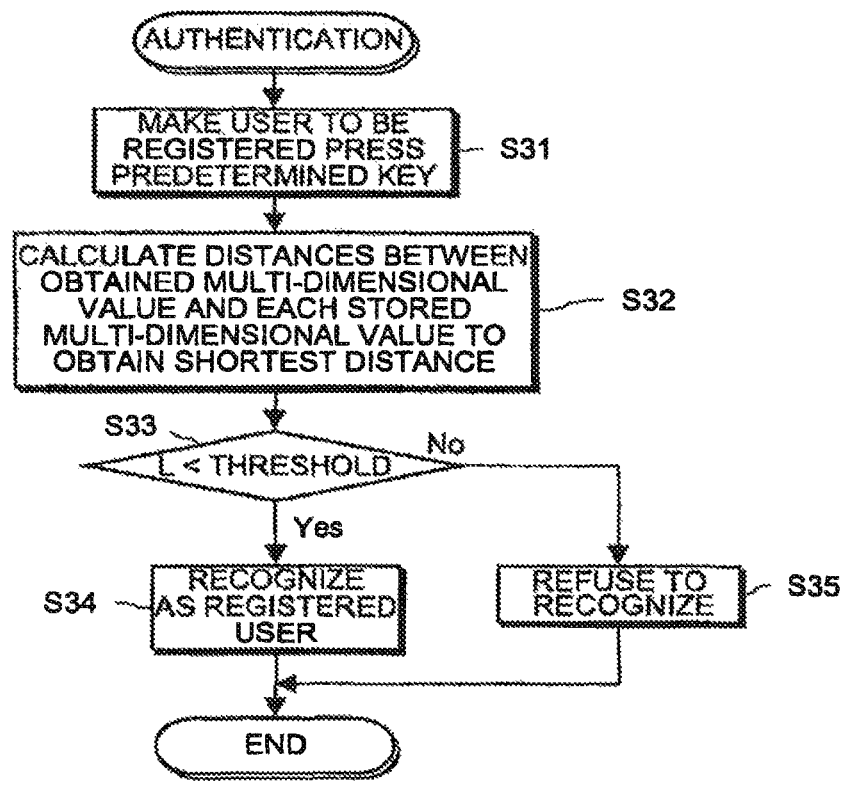
FIG. 29 is a flowchart showing the procedure of user authentication processing based on multi-dimensional values sent from the human-body detection apparatus 70, obtained when the user performs an input operation to the user input apparatus 1.

In FIG. 29, the procedure of the user authentication processing that uses the multi-dimensional values registered as the user identification information is shown in a flowchart form. This processing procedure is implemented, for example, in a form in which the CPU 201 executes predetermined program code. The processing procedure for user authentication will be described below by referring to the flowchart.

The user to be authenticated is made to press a predetermined key on the keyboard 10 (in step S31).

When the predetermined key is pressed, the distance between a multi-dimensional value obtained by the human-body detection apparatus 70 and each multi-dimensional value stored as the identification information (ID) of the user already registered (in step S32). The shortest distance obtained in the distance calculation is called L.

Then, it is determined whether the calculated shortest distance L is smaller than a predetermined threshold (in step S33).

When the shortest distance L is smaller than the threshold, the user being authenticated is recognized as a registered user (in step S34). When the shortest distance L is equal to or larger than the threshold, the computer refuses to recognize the user being authenticated (in step S35).

The user authentication method that uses multi-dimensional values obtained from the human-body detection apparatus 70, described above, allows authentication processing to be performed in a natural form, without imposing a special load on the user and without forcing the user to wear a special apparatus, such as an IC card.

When "pressing the predetermined key", described above, is changed to a password input, it is also possible to determine whether the password is input by the authorized person or by another person who impersonates the authorized person.

«Note»

*: The one-hand keyboard is, for example, described in a paper written by Edgar Matias, I. Scott Mackenzie, and William Buxton, "Half-QWERTY: A One-Handed Keyboard Facilitating Skill Transfer from QWERTY", Conference Proceedings on Human Factors in Computer Systems, 1993, pages 88-94.

Addition

The present invention has been described in detail by referring to the specific embodiments. It is obvious that persons skilled in the art can have modifications and alternatives of the embodiments within the scope of the present invention. In other words, the present invention has been disclosed in a form of illustrations, and should not be interpreted in a limited manner. To understand the scope of the present invention, the Claims described at the top should be considered.

INDUSTRIAL APPLICABILITY

According to the present invention, good user input apparatuses where the user can perform input operations by using part of the user's body as with a keyboard or a mouse, computers connected to the user input apparatuses and control methods for the computers connected to the user input apparatuses, and storage media can be provided.

In addition, according to the present invention, good user input apparatuses designed such that the user operates the apparatuses by both hands, computers connected to the user input apparatuses and control methods for the computers connected to the user input apparatuses, and storage media can be provided.

Further, according to the present invention, good user input apparatuses allowing the user to perform input operations without inconvenience even if the user cannot use one hand due to other work while the apparatuses are designed such that the user operates the apparatuses by both hands, computers connected to the user input apparatuses and control methods for the computers connected to the user input apparatuses, and storage media can be provided.

According to the present invention, a system can appropriately switch processing according to the state of a user's hand even if the user of a computer does not give an explicit command for switching the input mode.

According to the present invention, good user input apparatuses to which the user can directly input object operations and commands to a computer by using a finger tip of the user can be provided.

According to the present invention, good user input apparatuses to which the user can input object operations and commands to a computer in a non-contact manner can be provided.

According to-the present invention, good non-contact user input apparatuses which can recognize the information of two or more points, the shape of an approaching object, and the information of the distance to an object can be provided.

In a non-contact user input apparatus according to the present invention, a first capacitor-equivalent circuit equivalent to a capacitor is virtually formed at each of the intersections of transmission electrodes and receiving electrodes. A second capacitor-equivalent circuit is virtually formed in parallel to the first capacitor-equivalent circuit when an electrically conductive object, including a user's finger tip, approaches. The capacitance of the second capacitor-equivalent circuit is changed according to the extent of approaching of the electrically conductive object, including a finger tip. As a result, alternating current flowing through the first capacitor-equivalent circuit is changed. Therefore, with such a phenomenon being used, the non-contact user input apparatus can detect the contact of the finger tip and also measure the distance to the approached finger tip.

By scanning the transmission electrodes by alternating current and applying the current, an input position can be determined according to the positional relationship between a transmission electrode to which alternating current was sent and a receiving electrode that received alternating current. The non-contact user input apparatus can measure the outline of an approaching object by tracing the intersections of transmission electrodes and receiving electrodes where input positions are detected. In other words, the non-contact user input apparatus can detect approaching of an object, including a user's finger tip, and also recognize the outline of the object. Even when two or more users attempt to access the non-contact user input apparatus at the same time, finger tips of the users can be separately recognized.

The invention claimed is:

1. An information processing device comprising:
   a display apparatus configured to display a graphical user interface, the graphical user interface includes icons;
   an input apparatus superposed onto the display apparatus, the input apparatus includes a plurality of first electrodes arranged along a first direction and a plurality of second electrodes arranged along a second direction different than the first direction in a manner that at least one of the first electrodes overlaps the second electrodes and at least one of the second electrodes overlaps the first electrodes;
   a transmitter electrically connected to the first electrodes so as to supply a first signal to the first electrodes sequentially in a scanning manner; and a receiver electrically connected to the second electrodes so as to receive a second signal from said at least one of the second electrodes, the second signal is alterable according to a distance between an object and an intersection of a scanned first electrode and the second electrodes.

2. The information processing device according to claim 1, wherein resource objects are expressed in the graphical user interface by the icons.

3. The information processing device according to claim 1, wherein the icons correspond to a file, data, or a device.

4. The information processing device according to claim 1, wherein at least one of the icons is operable by an operation from the group consisting of a drag operation, a click operation, and a drop operation.

5. The information processing device according to claim 1, wherein the graphical user interface includes a menu.

6. The information processing device according to claim 1, wherein the graphical user interface includes a tool.

7. The information processing device according to claim 1, wherein the input apparatus includes a user input area, a plurality of fingers in the user input area are independently recognized.

8. The information processing device according to claim 1, wherein the input apparatus is configured to detect an input object making contact with the input apparatus.

9. The information processing device according to claim 1, wherein the input apparatus is configured to measure a distance between the input apparatus and an approaching input object.

10. An information processing method comprising:
displaying, by a display apparatus, a graphical user interface that includes icons;
superposing, onto the display apparatus, an input apparatus that includes a plurality of first electrodes arranged along a first direction and a plurality of second electrodes arranged along a second direction different than the first direction in a manner that at least one of the first electrodes overlaps the second electrodes and at least one of the second electrodes overlaps the first electrodes;
supplying, by a transmitter electrically connected to the first electrodes, a first signal to the first electrodes sequentially in a scanning manner; and
receiving, by a receiver electrically connected to the second electrodes, a second signal from said at least one of the second electrodes,
wherein the second signal is altered according to a distance between an object and an intersection of a scanned first electrode and the second electrodes.

11. The information processing method according to claim 10, wherein resource objects are expressed in the graphical user interface by the icons.

12. The information processing method according to claim 10, wherein the icons correspond to a file, data, or a device.

13. The information processing method according to claim 10, wherein at least one of the icons is operable by an operation from the group consisting of a drag operation, a click operation, and a drop operation.

14. The information processing method according to claim 10, wherein the graphical user interface includes a menu.

15. The information processing method according to claim 10, wherein the graphical user interface includes a tool.

16. The information processing method according to claim 10, wherein the input apparatus includes a user input area, a plurality of fingers in the user input area are independently recognized.

17. The information processing method according to claim 10, further comprising:
detecting, by the input apparatus, an input object making contact with the input apparatus.

18. The information processing method according to claim 10, further comprising:
measuring, by the input apparatus, a distance between the input apparatus and an approaching input object.

19. A computer program product embodied on a tangible non-transitory computer-readable data storage device, the computer program product comprising:
computer code for obtaining a distance between an input apparatus and an approaching input object,
wherein:
the input apparatus is superposed onto a display apparatus, the display apparatus is configured to display a graphical user interface,
the input apparatus includes a plurality of first electrodes arranged along a first direction and a plurality of second electrodes arranged along a second direction different than the first direction in a manner that at least one of the first electrodes overlaps the second electrodes and at least one of the second electrodes overlaps the first electrodes,
a transmitter is electrically connected to the first electrodes so as to supply a first signal to the first electrodes sequentially in a scanning manner, and
a receiver is electrically connected to the second electrodes so as to receive a second signal from said at least one of the second electrodes, the second signal is alterable according to a distance between an object and an intersection of a scanned first electrode and the second electrodes.

20. The computer program product according to claim 19, wherein the graphical user interface includes icons.

* * * * *